(12) United States Patent
Carlson et al.

(10) Patent No.: US 9,731,738 B2
(45) Date of Patent: Aug. 15, 2017

(54) RAIL VEHICLE SIGNAL ENFORCEMENT AND SEPARATION CONTROL

(71) Applicant: Metrom Rail, LLC, Crystal Lake, IL (US)

(72) Inventors: Richard C. Carlson, Village of Lake in the Hills, IL (US); Kurt A. Gunther, Round Lake Heights, IL (US); Marc W. Cygnus, Mundelein, IL (US)

(73) Assignee: METROM RAIL, LLC, Crystal Lake, IL (US)

( * ) Notice: Subject to any disclaimer, the term of this patent is extended or adjusted under 35 U.S.C. 154(b) by 0 days.

(21) Appl. No.: 14/809,950

(22) Filed: Jul. 27, 2015

(65) Prior Publication Data

US 2015/0329130 A1    Nov. 19, 2015

Related U.S. Application Data

(63) Continuation of application No. 14/476,338, filed on Sep. 3, 2014.
(Continued)

(51) Int. Cl.
*B61L 27/04* (2006.01)
*B61L 27/00* (2006.01)
(Continued)

(52) U.S. Cl.
CPC ........ *B61L 27/0077* (2013.01); *B60T 8/1705* (2013.01); *B61L 3/125* (2013.01);
(Continued)

(58) Field of Classification Search
CPC .... B61L 3/18; B61L 3/22; B61L 3/221; B61L 3/24; B61L 15/0072; B61L 23/00;
(Continued)

(56) References Cited

U.S. PATENT DOCUMENTS 5,675,190 A    10/1997 Morita
8,200,380 B2 *    6/2012 Ghaly .................... B61L 3/008
701/19

(Continued)

OTHER PUBLICATIONS

PCT, Notification of Transmittal of the International Search Report and the Written Opinion of the International Searching Authority, or the Declaration, in International application No. PCT/US2014/053900, dated Feb. 18, 2015 (21 pages).

*Primary Examiner* — Zachary Kuhfuss
(74) *Attorney, Agent, or Firm* — McAndrews, Held & Malloy, Ltd.

(57) ABSTRACT

A system for vehicle management includes a control signal interface subsystem and a vehicle-mounted subsystem. Each of these subsystems includes an ultra-wideband (UWB) communications component. The subsystems communicate with each other through the UWB components. The vehicle mounted subsystem interfaces with a braking system of the vehicle. The vehicle mounted subsystem determines the distance between it and the control signal interface subsystem based on the time-of-flight of at least one communication between the subsystems. The vehicle-mounted subsystem can cause the braking system of the vehicle to activate if the distance between the vehicle-mounted subsystem and the control signal interface subsystem is less than a threshold.

18 Claims, 10 Drawing Sheets

Related U.S. Application Data

(60) Provisional application No. 61/959,729, filed on Sep. 3, 2013.

(51) Int. Cl.
  *B60T 8/17* (2006.01)
  *B61L 3/12* (2006.01)
  *B61L 25/02* (2006.01)

(52) U.S. Cl.
  CPC ............ *B61L 25/021* (2013.01); *B61L 25/025* (2013.01); *B61L 27/0038* (2013.01)

(58) Field of Classification Search
  CPC ...... B61L 23/18; B61L 25/025; B61L 25/026; B61L 25/06; B61L 27/04; B61L 27/0038; B61L 27/0077
  See application file for complete search history.

(56) References Cited

U.S. PATENT DOCUMENTS

| | | | |
|---|---|---|---|
| 8,478,463 B2* | 7/2013 | Knott | B61L 3/221 246/167 R |
| 8,651,433 B2* | 2/2014 | Ghaly | B61L 3/008 246/167 R |
| 9,134,411 B2* | 9/2015 | Soderi | B61L 3/008 |
| 2004/0155760 A1 | 8/2004 | Grisham | |
| 2005/0010338 A1* | 1/2005 | Kraeling | B61L 3/121 701/19 |
| 2005/0110628 A1* | 5/2005 | Kernwein | B61L 23/00 340/457 |
| 2006/0015224 A1* | 1/2006 | Hilleary | B61L 3/125 701/19 |
| 2006/0151672 A1 | 7/2006 | Heddebaut | |
| 2008/0040023 A1* | 2/2008 | Breed | B60N 2/2863 701/117 |
| 2008/0114519 A1 | 5/2008 | DuFaux | |
| 2010/0063656 A1* | 3/2010 | Knott | B61L 3/221 701/19 |
| 2010/0225527 A1 | 9/2010 | Talty | |
| 2010/0268466 A1* | 10/2010 | Amutham | B61L 25/025 701/301 |
| 2011/0046845 A1 | 2/2011 | Kozlay | |
| 2011/0184621 A1* | 7/2011 | Bock | B61L 3/008 701/70 |
| 2011/0234451 A1* | 9/2011 | Bock | B61L 3/125 342/109 |
| 2012/0029740 A1* | 2/2012 | Bock | B61L 1/10 701/20 |
| 2012/0296562 A1 | 11/2012 | Carlson | |
| 2013/0138276 A1* | 5/2013 | Soderi | B61L 3/008 701/19 |
| 2014/0229096 A1 | 8/2014 | Carlson | |
| 2015/0060608 A1* | 3/2015 | Carlson | B61L 3/125 246/122 R |

\* cited by examiner

FIGURE 7

- Detecting first serialized RFID tag — 710
- Detecting second serialized RFID tag — 720
- Referencing database — 730
- Determining vehicle location information — 740
- Determining vehicle speed information — 750
- Communicating information to a rail network — 760

RAIL VEHICLE SIGNAL ENFORCEMENT AND SEPARATION CONTROL

CROSS REFERENCE TO RELATED APPLICATIONS

This application is a continuation of U.S. patent application Ser. No. 14/476,338, filed Sep. 3, 2014, and claims priority to U.S. Provisional Patent Application No. 61/959,729, entitled "Light Rail Control System," filed on Sep. 3, 2013, each of which is incorporated by reference in its entirety herein.

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

Railroads have had several severe collisions and other accidents, some resulting in fatalities, when adequate spacing has not been maintained between rail vehicles. A major issue causing rail collisions involves vehicle operators failing to respond to a control point signal, such as a stop signal. For example, vehicle operators may fail to notice a control point signal due to visibility issues, equipment errors, operator maladies, or negligence. In such a situation, rail vehicles may continue to travel along a track not safe for travel, potentially resulting in disastrous collisions and/or accidents.

The Federal Railroad Administration established a system of rail regulations called positive train control ("PTC"). PTC is a system of functional regulations for monitoring and controlling train movements to provide increased safety. PTC, however, is an expensive system that is difficult to implement, particularly in light of the technology presently available. For public transit systems, PTC will generally increase travel time, passenger wait time, and decreased throughput.

Moreover, problems can also occur on railroads when sufficient spacing between rail vehicles is not properly maintained. Rail vehicle spacing can be monitored and maintained using various equipment and sensors installed on rail vehicles. For example, spacing between vehicles may be monitored by use of a global positioning system ("GPS") that tracks and follows the location of rail vehicles on a rail track.

However, present methods and systems for controlling and enforcing rail vehicle separation can be insufficient, particularly under certain circumstances. For example, in subterranean tunnels, or subways, rail vehicles may not have a clear view of the sky, and therefore, may not be traceable by GPS methods. It can therefore be difficult for the operator of such a rail vehicle, to know the location, speed, and position of the rail vehicle relative to other vehicles on the train track with the accuracy necessary to operate safely and efficiently. Moreover, it can be difficult for a rail vehicle control system to properly enforce separation among rail vehicles on a railroad track if the precise location of each rail vehicle is not accurately known. For example, PTC can "dead-reckon" using the odometer in non-GPS areas, but there may be degradation in accuracy. This degradation may be acute in commuter rail applications where train spacing is less than with freight rail.

SUMMARY

Certain embodiments of the present technology provide a rail vehicle control system installable on a rail vehicle. The rail vehicle control system can include a collision avoidance system including a transponder sensor module. In some embodiments, the transponder sensor module is operable to communicate with one or more transponder sensor modules installed on one or more proximate rail vehicles, and/or one or more signal control points to detect a distance between the rail vehicle and the proximate vehicle and/or the signal control point. For example, in certain aspects of the present technology, the collision avoidance system can detect a distance between the rail vehicle and the proximate rail vehicle or signal control point based at least in part on the time it takes a signal to travel between the transponder sensor modules. The control system can also include a radio frequency identification ("RFID") reader adapted to detect serialized RFID tags mounted at locations along a railroad. In certain aspects, the vehicle separation control system includes a data collection system operable to obtain rail vehicle information from the collision avoidance system and the RFID reader. The data collection system can include, for example, a data storage device. In some embodiments, the rail vehicle control system includes a supervisory component in communication with the collision avoidance system, the RFID reader, and the data collection system. The supervisory component can be operable, for example, to communicate rail vehicle information to a rail network.

Certain embodiments of the present technology provide a railroad control system operable to manage rail vehicle separation on a railroad track. The railroad control system can include a rail network that maintains information relating to the location and speed of rail vehicles on the railroad track. In some embodiments, the railroad control system includes multiple serialized RFID tags mounted at locations along the railroad track. The railroad control system can also include at least one signal control point located along the railroad track. Each signal control point can be operable to display signals viewable by a rail vehicle operator. In some embodiments, the signal control points comprise a station transponder sensor module operable to send and receive wireless signals. Each signal control point can also be operable to communicate with the rail network. Some embodiments also include a vehicle mounted system installable on a rail vehicle. The vehicle mounted system can include a vehicle transponder sensor module operable to communicate with a station transponder sensor modules installed in a signal control point to detect a distance between the rail vehicle and the signal control point. The vehicle mounted system can also include a RFID reader adapted to detect the serialized RFID tags mounted along the railroad track. In certain embodiments, the vehicle mounted system also includes data collection system in communication with the vehicle transponder sensor module and the RFID reader. The data collection system can also include a data storage device. In some aspects, the vehicle mounted system also includes a supervisory component operable to communicate with the rail network. In some embodiments of the present technology, the vehicle mounted system obtains vehicle information relating to the railroad track that the rail vehicle is traveling upon, the rail vehicle location, and the rail vehicle speed based on the serialized RFID tags detected by the RFID reader. In some embodiments, the vehicle mounted system can also communicate the vehicle information to the rail network.

The present disclosure also provides a method for determining the speed and location of a rail vehicle traveling on a railroad track. The method can include the step of detecting a first serialized RFID tag installed along a railroad track with an RFID reader installed on the rail vehicle, where the first serialized RFID tag is detected at a first time (e.g., time t1). The method can also include the step of detecting a second serialized RFID tag installed along the railroad track with the RFID reader, where the second serialized RFID tag is detected at a second time (e.g., an earlier or later time t2). The method can also include the step of referencing a database to obtain information relating to the location of the first and second serialized RFID tags. In some embodiments, the method includes determining vehicle location information based at least in part on the information relating to the location of the first and second serialized RFID tags. Some embodiments of the method can also include determining vehicle speed information based at least in part on the location of the first RFID tag and the first time, and the location of the second RFID tag and the second time. The method can also include the step of communicating the vehicle location information and the vehicle speed information to a rail network, for example, communicating the information to a rail network via a reporting station installed along a railroad track.

Certain embodiments of the present technology also provide a method for enforcing rail vehicle adherence to control signals. The method can comprise the step of communicating a control signal via a signal control point. In some aspects, the method includes the step of detecting a distance between a rail vehicle and the signal control point using a collision avoidance system. In some embodiments, the step of determining a distance can be based at least in part on the time it takes a signal to travel between the transponder sensor modules on the rail vehicle and signal control point, for example. The collision avoidance system can comprise, for example, one or more transponder sensor modules installed on each of the rail vehicle and the signal control point. In certain embodiments, the method includes the step of generating a warning signal on the rail vehicle via a warning system when the collision avoidance system detects that the rail vehicle is approaching a signal control point that is communicating a stop signal. In some embodiments, the method can also include the step of automatically braking the rail vehicle when the collision avoidance system detects that the rail vehicle is not observing a stop signal communicated by the signal control point.

Certain embodiments of the present technology provide for a system for vehicle management. The system includes a control signal interface subsystem including an ultra-wideband (UWB) communications component. The system also includes a vehicle-mounted subsystem including a UWB communications component. The vehicle-mounted subsystem is configured to: interface with a braking system of the vehicle; communicate with the UWB communications component of the control signal interface subsystem via the UWB communications component of the vehicle-mounted subsystem; and determine a distance between the vehicle-mounted subsystem and the control signal interface subsystem based on a time-of-flight of at least one communication between the UWB communications component of the control signal interface subsystem and the UWB communications component of the vehicle-mounted subsystem.

According to a technique, the vehicle-mounted subsystem is further configured to generate an alert if the distance between the vehicle-mounted subsystem and the control signal interface is less than a threshold. According to another technique, the vehicle-mounted subsystem is further configured to cause the braking system of the vehicle to activate if the distance between the vehicle-mounted subsystem and the control signal interface is less than a threshold. According to another technique, the vehicle-mounted subsystem further includes: a radio-frequency identification (RFID) subsystem configured to scan at least one RFID tag external to the vehicle to retrieve information stored on the at least one RFID tag. In this technique, the vehicle-mounted subsystem is further configured to determine a distance between the vehicle-mounted subsystem and the control signal interface subsystem based on the information stored on the at least one RFID tag. According to another technique, the vehicle-mounted subsystem is further configured to substantially continuously receive information relating to speed of the vehicle. The vehicle-mounted subsystem determines a changing distance between the vehicle-mounted subsystem and the control signal interface subsystem based on the information stored on the at least one RFID tag and the information relating to speed of the vehicle. According to another technique, the system further includes an access point external to the vehicle. In this technique, the vehicle-mounted subsystem is further configured to: store data relating to prior behavior of the vehicle; and communicate the data relating to prior behavior of the vehicle with the access point.

Certain embodiments of the present technology provide for a system for vehicle management that includes: a control signal interface subsystem including an ultra-wideband (UWB) communications component; a first vehicle-mounted subsystem including a UWB communications component, wherein the first vehicle-mounted subsystem is configured to interface with a braking system of the vehicle; and a second vehicle-mounted subsystem including a UWB communications component, wherein the second vehicle-mounted subsystem is configured to be mounted on another vehicle. The first vehicle-mounted subsystem is configured to: communicate with the UWB communications component of the control signal interface subsystem via the UWB communications component of the first vehicle-mounted subsystem; communicate with the UWB communications component of the second vehicle-mounted subsystem via the UWB communications component of the first vehicle-mounted subsystem; determine a distance between the first vehicle-mounted subsystem and the control signal interface subsystem based on a time-of-flight of at least one communication between the UWB communications component of the control signal interface subsystem and the UWB communications component of the first vehicle-mounted subsystem; and determine a distance between the first vehicle-mounted subsystem and the second vehicle-mounted subsystem based on a time-of-flight of at least one communication between the UWB communications component of the second vehicle-mounted subsystem and the UWB communications component of the first vehicle-mounted subsystem.

According to one technique, the first vehicle-mounted subsystem is further configured to: generate an alert if the distance between the first vehicle-mounted subsystem and the control signal interface is less than a first threshold; and generate an alert if the distance between the first vehicle-mounted subsystem and the second vehicle-mounted subsystem is less than a second threshold. According to another technique, the first vehicle-mounted subsystem is further configured to: cause the braking system of the vehicle to activate if the distance between the first vehicle-mounted subsystem and the control signal interface is less than a first threshold; and cause the braking system of the vehicle to activate if the distance between the first vehicle-mounted subsystem and the second vehicle-mounted subsystem is less than a second threshold. According to a technique, the first vehicle-mounted subsystem further comprises: a radio-frequency identification (RFID) subsystem configured to scan at least one RFID tag external to the vehicle to retrieve information stored on the at least one RFID tag; and wherein the first vehicle-mounted subsystem is further configured to determine a distance between the first vehicle-mounted subsystem and the control signal interface subsystem based on the information stored on the at least one RFID tag. The first vehicle-mounted subsystem may be configured to substantially continuously receive information relating to speed of the first vehicle; and the first vehicle-mounted subsystem may determine a changing distance between the first vehicle-mounted subsystem and the control signal interface subsystem based on the information stored on the at least one RFID tag and the information relating to speed of the first vehicle. According to one technique, the system includes an access point external to the vehicle. The first vehicle-mounted subsystem is further configured to: store data relating to prior behavior of the vehicle; and communicate the data relating to prior behavior of the vehicle with the access point.

Certain embodiments of the present technology provide for a vehicle-mounted system for interfacing with a brake loop of a vehicle, wherein the vehicle-mounted system comprises: a switch including a first contact configured to connect to a first side of the brake loop and a second contact configured to connect to a second side of the brake loop; and at least one processor in electrical communication with the switch. The at least one processor is configured to: automatically determine a braking event without receiving information about a status of an operator-controlled actuator; open the switch upon an occurrence of the braking event, thereby electrically disconnecting the first contact from the second contact; and close the switch upon an expiration of the braking event, thereby electrically connecting the first contact with the second contact. According to one technique, the at least one processor is further configured to cause an alert to be generated upon occurrence of the braking event. According to another technique, the at least one processor is configured to determine the expiration of the braking event based on a change in status of an operator-controlled input.

Certain embodiments of the present technology provide for a system for vehicle speed management, wherein the system comprises: a control signal interface subsystem; and a vehicle-mounted subsystem. The vehicle-mounted subsystem is configured to: communicate with the control signal interface subsystem to receive information corresponding to a status of the control signal; determine a rule for behavior of the vehicle according to the information corresponding to the status of the control signal; and observe operation of the vehicle to evaluate compliance with the rule. According to one technique, the rule corresponds to the status of the control signal being at least one of red, double red, yellow, or double yellow. According to another technique, the rule specifies a stop-time duration for the vehicle. The rule may specify a speed for the vehicle. The rule may specify a maximum speed for the vehicle after an expiration of the stop-time.

BRIEF DESCRIPTION OF SEVERAL VIEWS OF THE DRAWINGS

FIG. 7 is a flow diagram of a method for determining the speed and location of a rail vehicle on a railroad track in accordance with at least one embodiment of the present technology.

Figure 1:
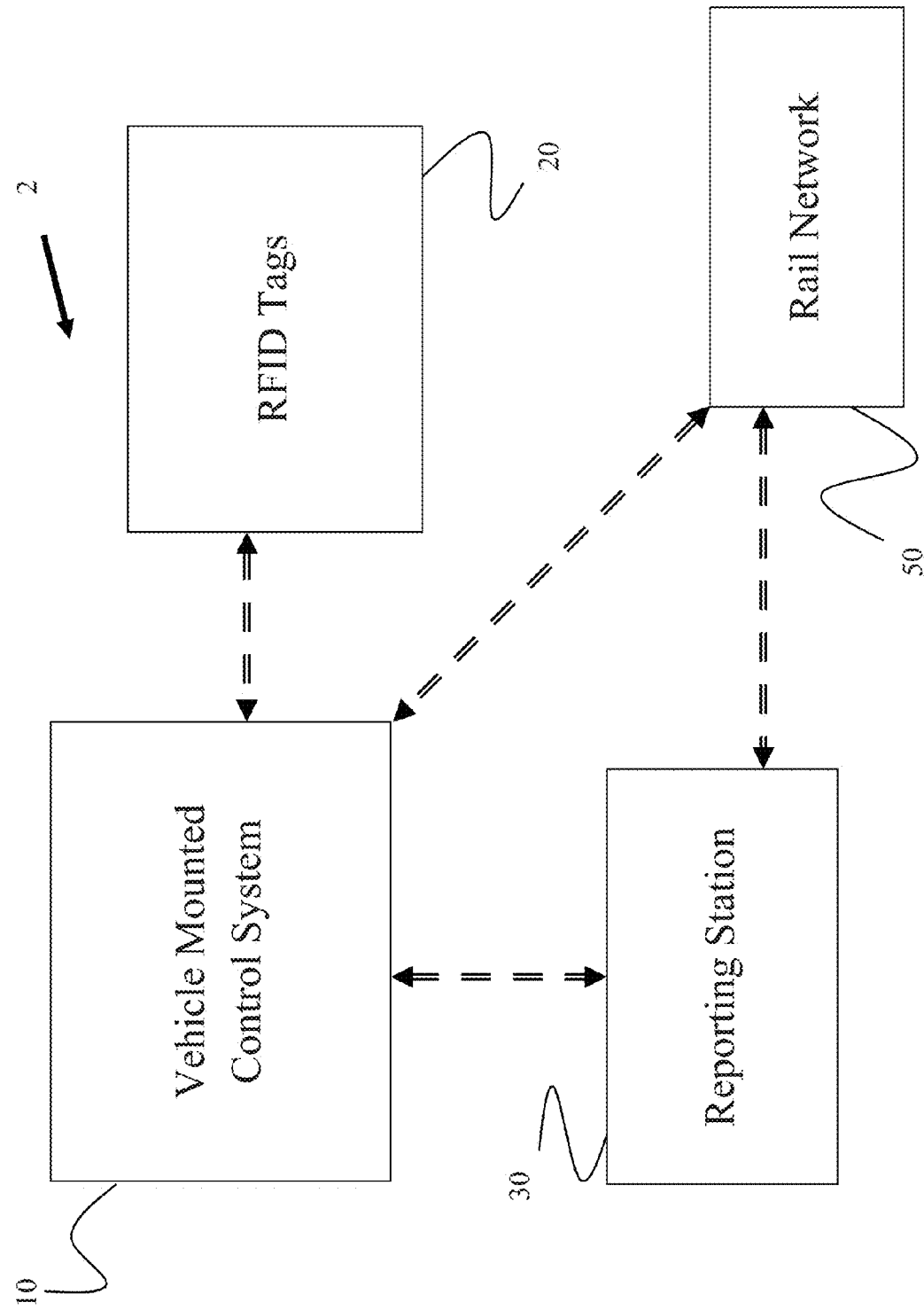
FIG. 1 is a block diagram of a rail control system for enforcing separation of rail vehicles on a railroad track in accordance with at least one embodiment of the present technology.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

The present disclosure generally relates to rail vehicle control systems and methods. More specifically, the present disclosure describes systems and methods for enforcing observance to rail signals, for enforcing rail speed limits, for controlling and enforcing rail vehicle separation on railroad lines, or for temporary speed restriction enforcement for railway workers or degraded rail conditions, for example, on light rail lines.

The present disclosure relates to systems and methods that control rail lines. The present disclosure also provides technology that provides information about the location and traveling speed of trains on a railroad track. For example, the present technology provides systems and methods for alerting a vehicle operator when the rail vehicle is approaching a control signal at an unsuitable rate, and for automatically braking such vehicles. The present disclosure can be used, for example, in connection with public transit (e.g., light rail lines or commuter lines). The present disclosure, however, is by no means limited to public transit, and may be adapted for use with any combination of vehicles and/or control signals. The present disclosure also provides systems and methods for enforcing rail speed limits (whether temporary or permanent) and for alerting a vehicle operator when the rail vehicle is exceeding a rail speed limit.

Light rail systems typically employ rail vehicles that are manually controlled by operators located in the control cabs. Railroads can achieve safe separation between these rail vehicles can by providing visual cues, for example, visual signals observable by a rail vehicle operator. For example, signal control points and/or reporting stations located about a railroad track (e.g., alongside a railroad track) can provide the visual signals used to control the rail vehicle operation and separation. The signal control points can generate signals, for example, by producing lights of varying colors or audible sounds. For example, a signal control point can provide red, yellow, and green lights that signal a train operator whether it is safe to proceed to the next signal, whether the train operator should stop (e.g., by displaying a red light), or whether the train operator should proceed with caution or at a slower speed (e.g., by displaying a yellow light).

Unfortunately, human error, equipment error, and/or faulty signaling issues, can result in occasional failure to properly communicate and follow important signals. For example, operators may fail to respond in a timely manner to a signal, or a signal change on the rail track. Additionally, visibility conditions may cause a vehicle operator to misread, or fail to read a signal along the rail track. Such misread signals can result in collisions and other accidents that can have catastrophic effects. Because rail vehicles are massive objects that operate at high speeds, even the slightest impacts and collisions can cause significant damage to people and property, both on the railroad track and vehicles, and in the nearby areas. This is particularly so in high areas of high population, for example, in urban areas that employ mass-transit systems in close proximity to pedestrian areas and other buildings.

To address these and other issues, the present technology introduces protective systems and features that provide safeguards against these potential accidents. For example, the present technology provides systems, methods, and features that can detect when a rail vehicle is approaching or passing a signal control point that is indicating for the vehicle to stop, slow down, or proceed with caution. The present technology also provides systems that can automatically brake or reduce the speed of such vehicles.

The present disclosure also describes systems and methods that detect the presence of a rail vehicle on the same rail track and the distance between the vehicles. In this manner, the technology can effectively warn the operator or even automatically brake the vehicle when the distance between vehicles has broached an acceptably safe value. The safe separation distance may be variable according to, for example, the speed of each vehicle and the relative closing speed of the vehicles.

The present disclosure also describes systems and methods that determine whether the rail vehicle is operating in excess of the rail speed limit. In this manner, the technology can effectively warn the operator, automatically brake the rail vehicle, or otherwise control the rail vehicle so that it operates within the rail speed limit.

The present technology also provides systems and methods that allow a rail vehicle (or a rail vehicle operator) to determine the location, operating track, and speed of a rail vehicle, and to communicate that information to a rail network. In particular, the present technology provides systems and methods that allow for the determination of rail vehicle location and speed without the use of GPS technology. This feature can be effective, for example, in subterranean subway tunnels where trains do not have an ability to communicate with satellites transmitting GPS signals.

The present technology utilizes a variety of functionalities and technologies to monitor, control, and enforce separation between rail vehicles on a rail track. For example, in some embodiments, the present technology combines ranging technology such as ultra-wideband ("UWB") ranging, RFID tags and detectors, an ad hoc wireless network between vehicles and control signal control portions, and a wireless or wired data collection system.

In some embodiments, the present technology can utilize a collision avoidance system, such as that disclosed by U.S. patent application Ser. Nos. 13/474,428 and 14/252,987. U.S. patent application Ser. Nos. 13/474,428 and 14/252,987, which are incorporated by reference, describe a system that allows rail vehicles to communicate to determine the separation distance between vehicles.

The present technology can provide a transponder sensor module and/or an UWB system mounted on one or more trains or rail vehicles and can also be integrated into signal control points and/or reporting stations located along a railroad track (e.g., a signal control point located at the side of the tracks). In this manner, the transponder sensor module can determine a distance between the object upon which the transponder sensor module is mounted and another transponder sensor module mounted on another object (for example, another rail vehicle or signal control point). If the rail vehicles violate a pre-set separation distance, or a continuously calculated distance given the current vehicle speed and/or relative closing speed, as calculated by the transponder sensor module, the present technology can then initiate an auto-brake function to slow the offending vehicle or vehicles in order to maintain a safe distance among rail vehicles on a common railroad track.

The present technology can use time of flight techniques, as described in, for example, U.S. patent application Ser. Nos. 13/474,428 and 14/252,987 to detect a distance between rail vehicles and/or between rail vehicles and other objects, such as signal control points and/or reporting stations. For example, in some embodiments of the present technology, signal and/or reporting stations located along a railroad track can be equipped with collision avoidance systems, transponder sensor modules, UWB systems, and/or other ranging technology or radio network signaling devices. In this manner, the rail vehicles can communicate with the signal control points to alert the vehicle operators when the rail vehicle is approaching a signal control point, and the signal that the station is currently indicating. For example, the present technology can warn the vehicle operator that the rail vehicle is approaching a signal control point indicating a "stop" signal, and that the operator should begin to reduce the speed of the vehicle.

Certain embodiments also provide an RFID system, which can comprise an RFID reader or reader head mounted on the train. The RFID system can also include RFID tags (e.g., active and/or passive RFID tags), which can be mounted at locations on, along, or around the railroad track. For example, the RFID tags can be mounted on the rails or ties of the railroad track, or alternatively, on structures adjacent to the track. The RFID tags can be individually serialized for identification purposes, and available for reference or look-up in a database. In addition, the tags may be programmed with specific data, such as a speed limit, track number, or distance to an associated signal, for example. In this manner, each RFID tag can be associated with a location, so that when the serialized RFID tag is read by the RFID reader, the system can have knowledge of the location of the rail vehicle upon which the RFID reader is mounted. Moreover, providing multiple RFID tags mounted on the railroad tracks allows the system to calculate the rail speed using the distance and time between successively read RFID tags. The RFID-based technique for calculating speed may be a supplemental, backup speed detection means. Other, potentially primary means of speed determination might be GPS, vehicle-mounted wheel speed sensor, and/or the change in distance and time to fixed ranging transducers.

In some aspects, the RFID system can also identify or determine a specific railroad track that it is operating upon. This feature can be particularly useful when the rail vehicle is traveling on a railroad track that operates in close proximity to a parallel railroad track. For example, if two trains are equipped with the collision avoidance system and approaching each other on parallel tracks, by using the RFID system, a rail vehicle or control system can determine that the two vehicles do not pose a collision threat, and therefore avoid false alarms and unnecessary auto-braking can be avoided. That is, by reading individually serialized or individually programmed RFID tags located on the track itself, the present technology allows for the identification of the specific track or line that the vehicle is traveling on, providing an ability to ignore or bypass unnecessary or invalid collision alerts.

By using the RFID system, the present technology enables a train location to be tracked with an accuracy greater than that allowable using only GPS methods. Conversely GPS technology does not have the resolution or accuracy necessary to determine a particular rail track that a vehicle is traveling upon, particularly when there are several parallel rail tracks located in close proximity to one another. In this manner, the present technology provides a system that can determine and be aware of the particular operating rail track for each vehicle, so that real collision threats can be determined, and other non-threatening situations, like an upcoming vehicle on a parallel rail track, can be ignored.

In some embodiments, the RFID system can also monitor a specific train position when the train is located in areas where conventional GPS positioning navigational aids are inoperative, such as tunnels and subways, for example. By reading each RFID tag's serialization code, or alternatively, a programmed mile-marker value, a specific location of the train can be determined. This information can then be wirelessly transmitted over to a supervisory component, for example, via a wired or wireless communication network, for further processing.

The data collection system can comprise an on-board data storage device capable of periodically sending data via wired or wireless transmission, for example, to or through a supervisory component. In this manner, the data collection system can communicate with a rail network to provide information about the rail vehicle location and speed, and to obtain information pertaining to the location and speed of other vehicles on the rail track. The data collection system can also maintain and transmit information relating to rail vehicle warning (e.g., collision alert) history, maintenance logs, and other related vehicle and track information. For example, the information can be transmitted to a rail network by communicating with communication modules located on reporting stations or signal control points located along the rail line. That is, the rail vehicle can communicate wirelessly with a reporting station to transmit and receive relevant vehicle information as the rail vehicle passes the reporting station on the track. The information can be assimilated into a database on the rail network and/or the rail vehicle data collection system for future analysis. In some embodiments the information can be used as a platform for generating automated alerts which can be sent out over a cell network, or other data stream.

In some embodiments, the present technology functions by independently monitoring the state of track block and switch control signals. For example, if a vehicle is approaching a signal control point indicating a red (i.e., stop) signal, the present technology can notify the operator of the vehicle that the red signal is approaching via an audible tone, a visual indication, and/or continuously provide an updated distance to the red signal to help ensure that the operator is aware of the stop indication. In some embodiments, if the vehicle operator fails to stop the in an appropriate time or distance relative to the red signal, the technology can apply vehicle brakes to slow or stop the vehicle.

The present technology also provides systems and methods that can monitor the separation distance between equipped rail vehicles, and apply safeguards to assure that the vehicle operators are warned of potential collision threats, and/or apply automatic stopping and braking of the vehicles where a collision may be imminent. For example, the acceptable separation distance may be automatically varied by this system in response to vehicle speeds, the grade of the track, and/or track condition directives (a we rail condition, for example, would result in extended stopping distances).

The present technology can accommodate the diverse range of operating, weather, and ambient temperature conditions in a variety of locations and circumstances. For example, the present technology can account for various weather conditions (e.g., ice, rain, extreme temperatures, etc.) and other locations and/or circumstances that add variability to rail travel, such as time-of-day or traffic volume. For example, the present technology can operate with rail vehicles operating on street rails that must take automobile traffic and various nearby fixed obstructions into account. The present technology can also operate with subway vehicles or in subterranean tunnels that have visibility issues and may not have access to GPS technology. The present technology can also operate in rail conditions that include sharp curves, closely spaced parallel tracks and track switches, or multiple rail intersections or crossover switches.

Certain embodiments of the present technology are shown by way of the figures included with the present application. For example, FIG. 1 is a block diagram of a rail vehicle separation control system 2 in accordance with one or more embodiments of the present technology. The rail control system 2 can include a vehicle mounted control system ("VMCS") 10, which can be, for example, mounted or installed on a rail vehicle such as a train or subway car. In some instances, there may be more than one VMCS 10 mounted on a single vehicle (such as an articulated vehicle, where wiring between control systems is problematic or expensive). In some embodiments, the system 2 can comprise multiple VMCS's 10, mounted on several rail vehicles. The VMCS's 10 mounted on various rail vehicles can be configured to communicate with one another in order to determine the speed of the vehicles, and the relative distance between the vehicles, for example.

The system 2 can also comprise one or more reporting stations 30 located along a railroad. The reporting stations 30 can be located at or integrated with, for example, signal control points or other objects positioned at fixed positions along a railroad track. The reporting stations 30 can include a communication mechanism that allows the rail vehicles and/or the VMCS 10 installed on the rail vehicles to exchange data and information, and otherwise communicate with the reporting stations 30. For example, the reporting stations 30 can include transceivers that allow the reporting stations to send and receive information via Bluetooth, WiFi, radio signals, cellular signals, UWB, peer-to-peer networks, microwaves, infrared signals, lasers, ultrasonic signals, electromagnetic induction signals, or other modes of wireless communication.

The reporting station 30 can also communicate and exchange information with a rail network 50. For example, the reporting station can be in wireless or wired communication with a rail network 50 that manages and maintains information relating to the speed and location of the rail vehicles connected to the network 50, as well as other information about the rail tracks and present weather conditions, for example. The rail network 50 can manage and control railroads and tracks in several locations or geographical areas. In some embodiments, the rail network 50 can manage and maintain railroad information pertaining to all railroad tracks in a region, a state, a country, a continent, or the world, for example.

Information from the VMCS 10 mounted on the rail vehicles can communicate with the network 50 via the reporting stations 30 such that each vehicle can be aware of the location of other vehicles traveling along the railroad, their speeds, weather conditions, railroad conditions or situations (e.g., steep grades, approaching sharp curves, rail crossings, or stations), and other information that can be useful to ensure safe and efficient rail transportation. In some embodiments, the VMCS 10 can communicate directly with the rail network 50 via a wireless communication mode without the use of a reporting station.

The rail control system 2 can also include one or more RFID tags 20 mounted at locations along a railroad track. For example, the RFID tags 20 can be mounted on the railroad rails or the ties of the railroad. In some embodiments, the RFID tags 20 can be mounted in other locations, for example, on the wall of a tunnel, on the ground, or on poles or stakes located along the railroad track. In this manner, the VMCS (which may include an RFID reader) can read the RFID tags 20 located along the railroad track to obtain information about the location, operating track, track speed limit, and/or speed of the vehicle.

Figure 2:
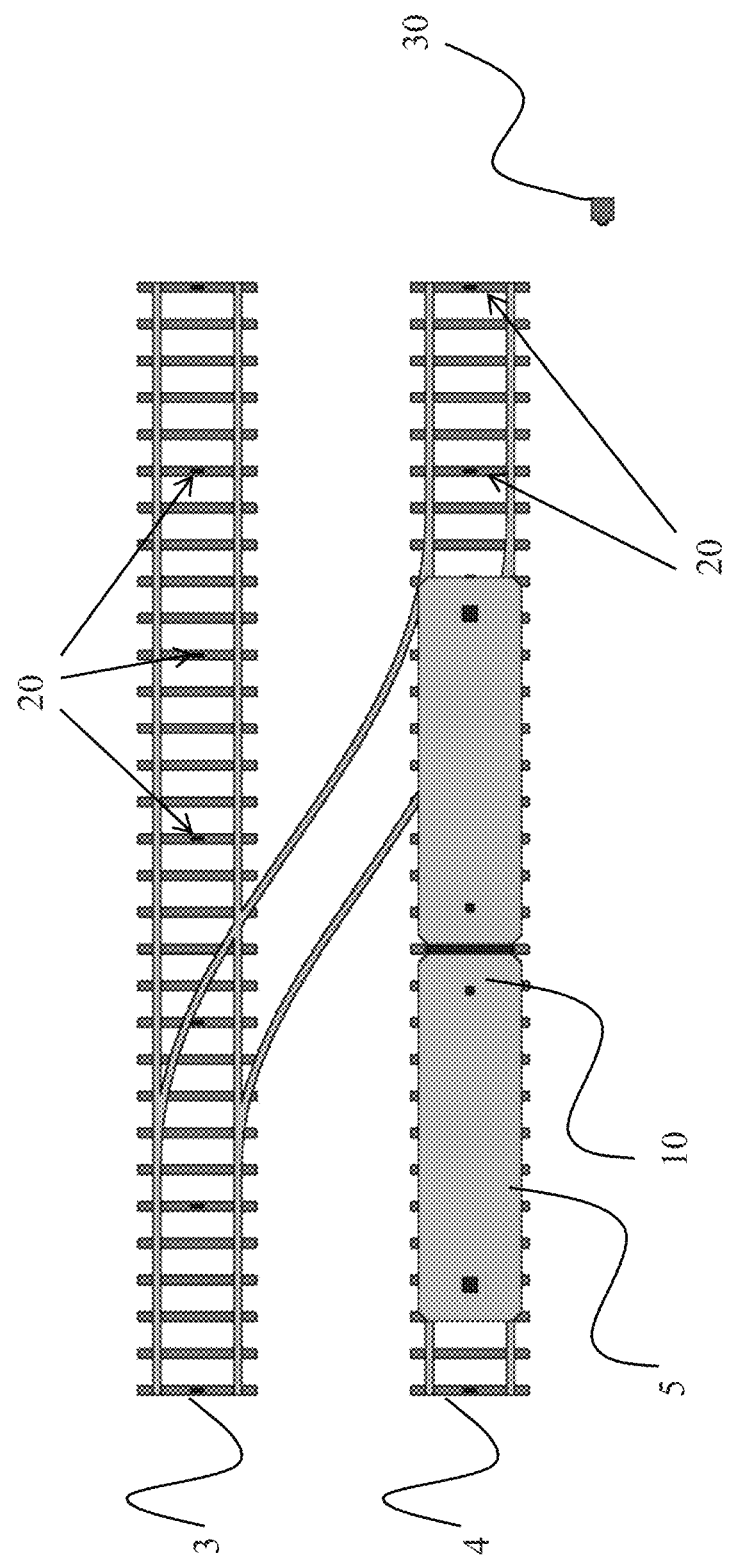
FIG. 2 shows an overhead view of a rail vehicle on a rail line equipped with a separation control system in accordance with at least one embodiment of the present technology.

FIG. 2 shows an overhead view of a rail vehicle 5 on a railroad line equipped with a rail vehicle separation control system in accordance with at least one embodiment of the present technology. FIG. 2 depicts two railroad tracks 3 and 4 running parallel to one another, and a rail vehicle 5 traveling along one railroad track 3. Each of the tracks 3 and 4 has a plurality of RFID tags 20 located on the railroad ties of the track. As shown in FIG. 2, the RFID tags 20 are positioned about every six ties; however, in some embodiments, the RFID tags can occur with more or less frequency as necessary for accurately determining the speed, track, and location of the rail vehicles 5. In some embodiments, the RFID tags can be installed more frequently, for example, one RFID tag on every tie, or on every second, third, fourth, or fifth tie. Alternatively, the RFID tags can be installed less frequently, such as one RFID tag on every ten, 20, 30, 50, or 100 railroad ties. As another example, RFID tags could be located at a distance prior to signals that would allow a train at the highest speed to stop before the signal if braking began at the RFID tag (plus some safety margin), as well as on either side of switches to indicate the track segment on which the train is now operating. There may also be redundant tags at those locations.

Where the RFID tags are positioned closer together and occur with greater frequency, the system can detect the location and speed of the rail vehicle 5 with greater accuracy. For example, where the RFID tags are placed close enough together so that a slower moving rail vehicle can detect several RFID tags per second, the separation control system can continually determine and calculate the location and speed of the vehicle with the passing and detection of each RFID tag. However, RFID tags that are too close together may not be distinguishable by a rail vehicle traveling at a high rate of speed, and may therefore result in a less accurate speed determination. Conversely, where the RFID tags are located farther apart, the system may be unaware of the precise location and speed of the rail vehicle 5 in between the RFID tags, but the sufficient separation can assure that each RFID tag is properly readable and distinguishable from the others. Accordingly, in some embodiments, the RFID tags are placed sufficiently close together so as to accurately provide rail vehicle location and speed information, while also being sufficiently spaced to ensure that each RFID tag can be properly detected and distinguished by the VMCS 10 on the rail vehicle 5.

FIG. 2 also shows a reporting station 30 located along the railroad track 4. As shown, the reporting station 30 is located to the side of the railroad tracks in close proximity to the tracks. In this manner, the reporting station can be visible to a vehicle operator on a passing rail vehicle. In some embodiments, the reporting station 30 can transmit and/or receive information from a passing rail vehicle 5 via a VMCS 10, for example. The reporting station 30 can then transmit rail vehicle information and/or other information (e.g., information regarding weather conditions) to the rail network. For example, the reporting station 30 can include a transponder sensor module adapted to communicate with the transponder sensor module installed on the rail vehicle 5.

Figure 3:
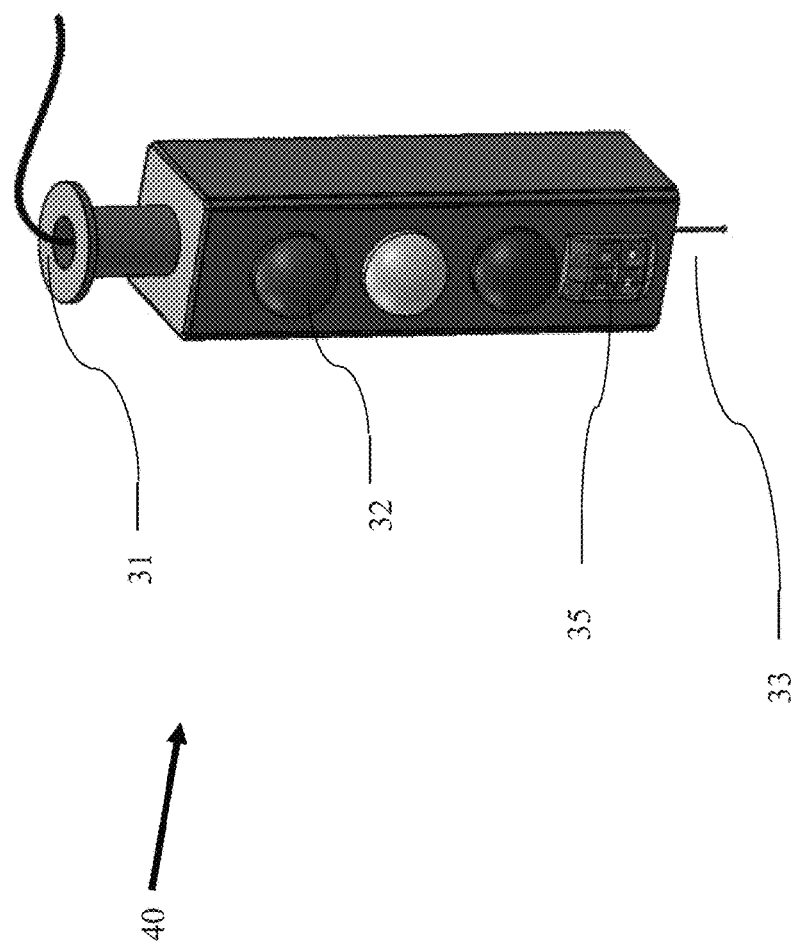
FIG. 3 shows an example of an integrated signal control point used in accordance with at least one embodiment of the present technology.

The reporting station 30 can also be, for example, a signal control point that generates signals viewable by an operator of the rail vehicle 5. For example, the reporting station 30 can provide signals in the form of various colored lights that provide information and/or instructions to an operator of a passing rail vehicle 10. The reporting station 30 may also communicate information (e.g., signal state or other types of information known to the reporting station 30) to the VMCS 10. FIG. 3 shows an example of a reporting station that operates as an integrated signal control point 40 in accordance with the present technology. The signal control point 40 comprises wiring 31 that can connect the signal control point 40 to a power source, a processor, and/or other controlling equipment. The signal control point also comprises one or more signal lights 32, which can be, for example, LED signal lights.

The signal lights can operate as a signal where the illumination of certain lights indicates a certain railroad track status, an instruction, or other information. For example, when a red light is illuminated, the signal control point can be indicating that the operator of the passing rail vehicle 5 should stop the vehicle 5. A green light can indicate that the rail vehicle 5 can proceed to travel along the track at the authorized speed. And a yellow light can indicate, for example, that the rail vehicle operator should proceed with caution, or be prepared to stop at an upcoming signal. In some embodiments, the signal control point can include other signals, for example a double red signal (or a red over red signal), which can indicate, for example, that the vehicle should stop and stay. In this manner, only an "authorized person," such as an inspector or higher ranking officer can hand flag a car through a double red signal. In some embodiments, the signal control point can also display a double yellow (or a yellow over yellow) signal, indicating that the operator should stop, and then proceed at a restricted speed with caution, for example, because an upcoming station may be occupied by a train.

The signal control point can also comprise a communication link 35, which allows for communication and/or information exchange with passing rail vehicles and a rail network 50. The communication link 35 can be, for example, a component of the AURA™ system provided by Metrom Rail, which is described in U.S. patent application Ser. Nos. 13/474,428 and 14/252,987 that are incorporated by reference. The communication link 35 can communicate, for example, with a VMCS 10 mounted on a passing rail vehicle 5. In this manner, the communication link 35 can be used to execute warning signals as a rail vehicle 5 is approaching the signal control point 40 and/or to execute other functionality, such as automatic braking when the rail vehicle 5 is not heeding the signal control point 40 instructions. In some embodiments, the communication link 35 can be, for example, a transponder sensor module.

Referring again to FIG. 1, the rail vehicle separation control system 2 comprises a VMCS 10 that is mounted on a rail vehicle, and communicates, either directly or indirectly, with a rail network 50. The VMCS 10 also senses RFID tags 20 that are located along a railroad track. One embodiment of the VMCS 10 is depicted in greater detail in FIG. 4.

Figure 4:
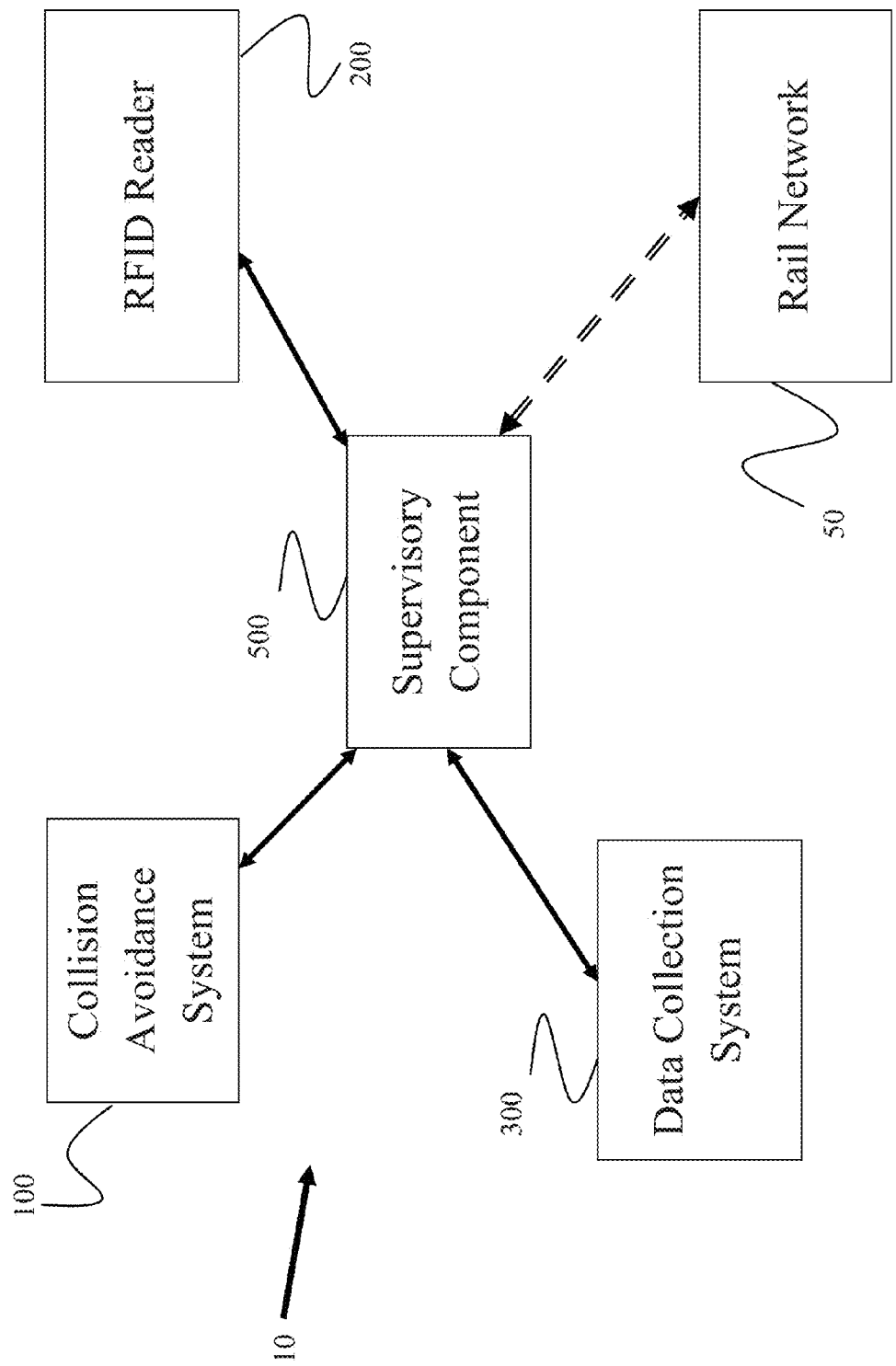
FIG. 4 is a block diagram of a vehicle mounted control system used in accordance with at least one embodiment of the present technology.

FIG. 4 is a block diagram of a VMCS 10 that can be used in connection with the rail line vehicle separation control system of the present technology. The VMCS 10 can comprise one or more components that can be mounted, connected, or otherwise installed on a rail vehicle. For example, the VMCS 10 can be a single module comprising one or more components that and installable at a location on a rail vehicle. Additionally and/or alternatively, the VMCS 10 can comprise one or more modules, each module comprising one or more components and being installable at one or more locations on a rail vehicle. In some embodiments, the VMCS 10 is adapted to communicate with one or more VMCS's 10 installed on another rail vehicle operating on the same railroad track.

In certain embodiments, the VMCS 10 comprises a collision avoidance system 100, an RFID reader 200, a data collection system 300 and a supervisory component 500. The VMCS 10 can include, or be in wireless communication with the rail network 50 that manages and maintains information about various rail vehicles and/or other VMCS's installed on vehicles on a railroad track.

The collision avoidance system 100 can be adapted to determine a distance between the rail line vehicle and another rail line vehicle operating on the same railroad track. For example, the collision avoidance system 100 can be adapted to communicate with a nearby or proximate rail vehicle operating on the same track. In some embodiments, the collision avoidance system 100 can communicate with at least the rail vehicle that is directly in front of it, and the rail vehicle that is directly behind it on the same railroad track. In this manner, the collision avoidance system 100 can determine a distance between the rail vehicle and the proximate rail vehicles on the same track. In some embodiments, the collision avoidance system 100 can include or incorporate one or more components of AURA™ system and/or the system described in U.S. patent application Ser. Nos. 13/474,428 and 14/252,987 (which have been incorporated by reference in their entireties).

Figure 5:
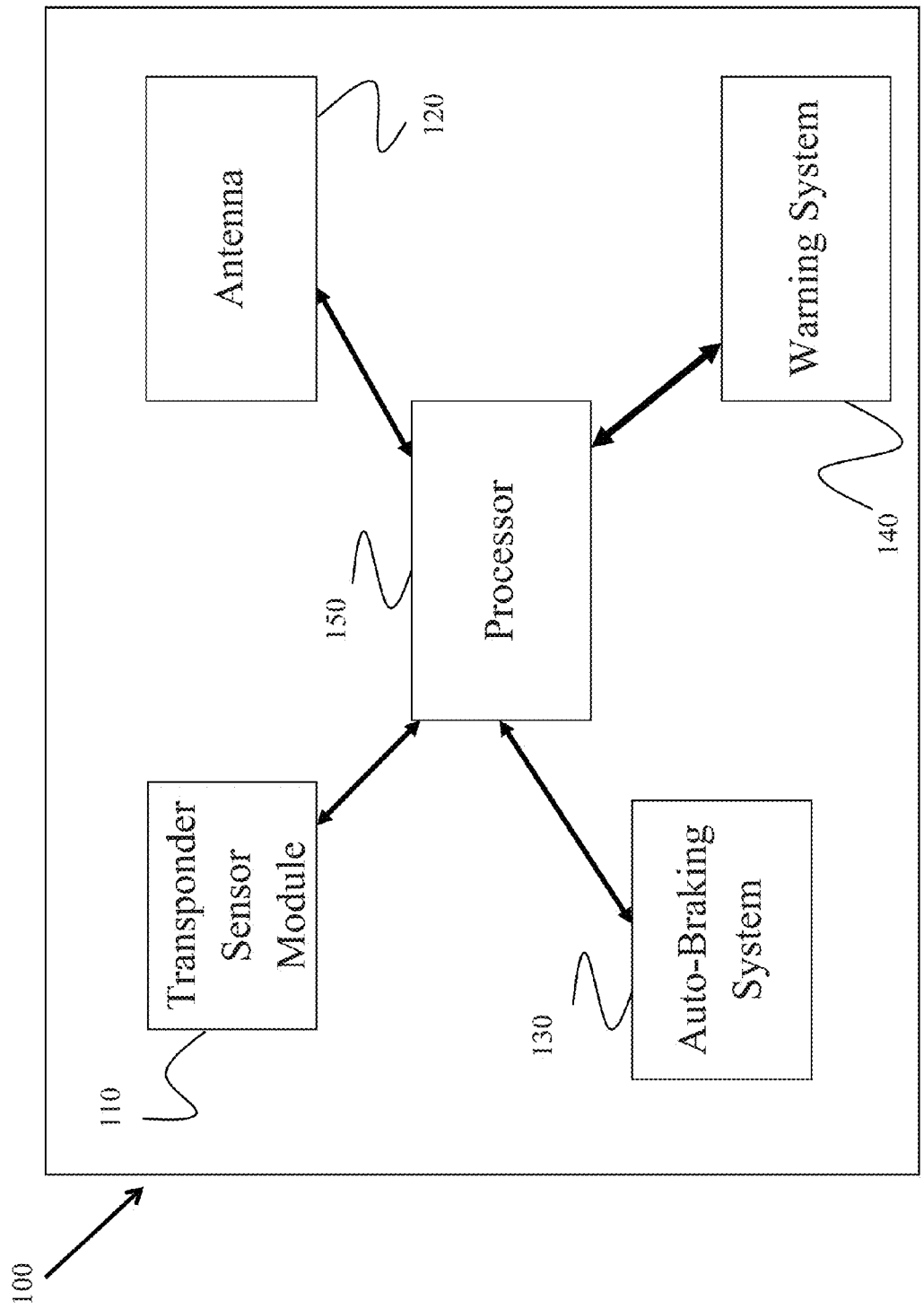
FIG. 5 is a block diagram of a collision avoidance system used in accordance with at least one embodiment of the present technology.

A more detailed view of a collision avoidance system 100 is provided in FIG. 5. FIG. 5 is a block diagram of a collision avoidance system 100, which can include, for example, one or more transponder sensor modules 110, one or more antennae 120, an auto-braking system 130, a warning system 140 and a processor 150, or central control unit. As disclosed herein, a "processor" may include more than one processors acting together to achieve a given function. According to one technique, the processor 150 includes a main processor and a safety processor to make the system more robust and fail-safe.

One or more transponder sensor modules 110 can be located on the rail vehicle. According to one technique, one transponder sensor module 110 is located on or proximate to the front of the rail vehicle, and another transponder sensor module 110 is located on the back of the vehicle. According to another technique, only one transponder sensor module 110 is located at a known location on the rail vehicle.

In some embodiments, the transponder sensor module 110 is adapted to send out a signal and receive a reflective or responsive signal from a corresponding transponder sensor module installed on another rail vehicle. The transponder sensor module 110 can send signals using a one or more technologies and methods. For example, in some embodiments, the transponder sensor module 110 can be or include a UWB ranging unit configured to send UWB radio waves. Additionally and/or alternatively, the transponder sensor module 110 can comprise a transceiver configured to utilize another communication technology including, but not limited to, radio waves, lasers, ultrasonic waves, RADAR, or light signals (e.g., infrared signals), that can be reflected or re-sent at a determinable speed. The transponder sensor module 110 can be used to communicate with other transponder sensor modules installed on proximate rail vehicles, for example, by sending radio waves/pulses outward via the antenna 120 or other transceivers associated with the transponder sensor module 110.

In this manner, a distance between the various transponder sensor modules 110 (and thus, the distance between the rail vehicles upon which the transponder sensor modules are installed) can be determined. By measuring how long it takes a wave/pulse or a signal to travel (for example by reflecting and/or bouncing, or a precisely timed response) between two transceivers, the distance between the transponder sensor modules can be accurately determined. That is, the present technology can detect the distance between two rail vehicles and/or the distance between a rail vehicle and signal/reporting station based on the time it takes a signal to travel between the transponder sensor modules. This technique may be referred to as "time of flight." The processor 150 or another processing unit can be used to determine the distance between the vehicles based on the results of the time of flight.

Consider the scenario in which a transponder sensor module 110 is located on the back of a first rail vehicle and another transponder sensor module 110 is located on the front of a second rail vehicle. The first rail vehicle is in front of the second rail vehicle. In this scenario, the time of flight technique can be used to determine the distance between the two transponder sensor modules 110, and therefore the distance between the first and second rail vehicles.

Consider, alternatively, the scenario in which there is only one transponder sensor module 110 on the first rail vehicle and only one transponder sensor module 110 on the second rail vehicle. The first rail vehicle is in front of the second rail vehicle. Given the time of flight and the known length of one or more of the first or second rail vehicles, the distance between the vehicles can be determined. For example, if the transponder sensor modules 110 are located on the front of each rail vehicle, the distance between the vehicles would be a function of the distance between the transponder sensor modules 110 and the length of the first rail vehicle. As another example, if the transponder sensor modules 110 are located on the back of each rail vehicle, the distance between the vehicles would be a function of the distance between the transponder sensor modules 110 and the length of the second rail vehicle.

In some embodiments of the present technology, the collision avoidance system 100 also includes a GPS unit that can be used in combination with (or as a component of) the transponder sensor module to determine a position (e.g., an absolute position) of the rail vehicle. In this manner, the present technology can combine GPS functionality with the time of flight technology to determine a separation distance between rail vehicles. The GPS and/or the time of flight technology can serve as redundant systems that assure a separation distance between rail vehicles is known even when one of the systems is not effectively working. For example, the GPS unit can be used to ensure that the time of flight technology is not providing incorrect separation distance information because of reflected signals. Moreover, the time of flight technology can be used to observe separation distance in situations where the GPS unit is incapable of receiving positioning information, for example, due to issues with satellite connectivity. This can be particularly useful, for example, for rail vehicles traveling in subterranean tunnels (e.g., subways), where there is limited or no access to GPS functionality. The GPS operating frequency may be 1.575 GHz. The system may include two GPS receivers, for example, to provide redundancy. GPS information may provide speed data and the vehicle direction of travel. Such data may allow for periodic self-calibration of the on-board vehicle speed measurement system. This can allow for automatic compensation of wheel wear (which can otherwise cause exaggerated speed measurements over time). The VMCS 10 may perform the automatic compensation.

The VMCS 10 may have a speed measurement system which may be distinct from the speedometer of the vehicle (prior to installation of the VMCS 10). The VMCS 10 may receive information regarding the rate of wheel rotation, and speed may be calculated therefrom. The VMCS 10 may also be capable of determining speed information from GPS information and/or RFID tag scanning rate. It may also be possible to measure speed using the UWB time-of-flight data, since this data provides substantially continuous location information over time.

In some embodiments of the present technology, the collision avoidance system 100 can operate fully, effectively, and safely without GPS technology. This is particularly true for subway rail vehicles, which can often have limited or no use for a GPS feature.

In some embodiments, the collision avoidance system 100 and/or the transponder sensor module 110 can communicate with reporting stations and/or signal control points, such as the signal control point 40 depicted in FIG. 3 (for example, via UWB communications). In this manner, the transponder sensor module 110 may communicate with the communication link 35 or another similar component of the signal control point 40 to determine a distance between the vehicle and the signal control point 40.

The VMCS 10 may also implement a second or redundant wireless network. Such a network may improve the robustness of the system. Such a network may be of a different type than the first network. For example, the second network may be a spread-spectrum network (for example, one that implements frequency hopping). Such a network may operate at 2.4 GHz. The second network may transmit information similar to what is transmitted by the first network.

When the collision avoidance system 100 determines that the signals provided by the signal control point 40 are not being followed by the rail vehicle operator, the processor 150 can operate one or more other functions of the collision avoidance system 100. For example, the processor may use the auto-braking system 130 to initiate an auto-braking feature to automatically brake or otherwise reduce the speed of the rail vehicle. In some embodiments, when the collision avoidance system 100 determines that the distance between the rail line vehicle and a proximate rail line vehicle operating on the same railroad track has come within a predetermined limit, the collision avoidance system 100 may initiate the auto-braking feature in order to prevent and/or reduce the likelihood of a collision. The processor can then log the auto-braking action, for example, in the data collection system 300 of the VMCS 10.

In some embodiments, the auto-braking system 130 can be adapted to automatically brake a rail vehicle based on the distance between the vehicle and a signal control point 40, depending on the signal indicated by the signal control point 40. For example, the collision avoidance system 100 can automatically brake the rail vehicle when the collision avoidance system 100 detects that the rail vehicle is not observing a stop signal communicated by the signal control point. In some embodiments, the collision avoidance system 100 may determine that the stop signal is not being observed based on the speed of the rail vehicle and the distance between the rail vehicle and the signal control point. For example, in some embodiments, there can be a safety point located on the railroad tracks relative to the signal control point, the safety point representing the furthest location where rail vehicles can come to rest when a stop signal is indicated in order to ensure safe railroad track operation. In some embodiments, the safety point can be, for example, at or around the location of the signal control point. When the distance between the rail vehicle and the signal control point approaches or exceeds a limit where it is no longer possible to bring the vehicle to a complete stop before the safety point during existing conditions, the auto-braking system 130 can automatically brake the vehicle.

In some aspects of the present technology, the speed and/or distance used to determine whether or not to apply the auto-braking system 130 can vary based on conditions. For example, when the tracks are we or icy, the collision avoidance system 100 may determine that the stop signal is not being observed at a lower rate of speed and/or distance from the signal control point than under normal dry conditions. In certain embodiments, the collision avoidance system 100 may determine that the stop signal is not being observed if the rail vehicle passes the signal control point. In other embodiments, the collision avoidance system 100 may determine that the stop signal is not being observed if the vehicle operator fails to respond to warnings or other commands for a predetermined period of time, for example.

The auto-braking system 130 does not include the vehicle brakes. Instead, the auto-braking system 130 can be configured to work with brakes and associated vehicle componentry. The auto-braking system 130 can provide one or more outputs that cause existing brakes to be applied (either at 100% of braking force or at some lesser level) or released.

The collision avoidance system 100 can also utilize the warning system 140 to initiate a warning signal as the rail vehicle approaches a signal control point 40 or another rail vehicle. The warning system 140 can be operable to initiate a warning signal indicating that the rail vehicle operator should decrease the speed of the rail vehicle. In some embodiments, the warning system 140 can operate to initiate a warning signal as the rail vehicle approaches or passes a signal control point indicating a stopping signal. Additionally and/or alternatively, the warning system 140 can be operable to initiate a warning signal when the distance between the rail vehicle and a proximate rail vehicle is within a predetermined limit. For example, the predetermined limit can be a value that ensures that the rail vehicle can safely be brought to a complete stop without colliding with the proximate vehicle. The predetermined limit can vary depending on the rail conditions, the weather conditions, and the speed of the rail vehicle and the proximate rail vehicle, for example.

For example, when a rail line vehicle is approaching a signal control point 40 indicating a red light, the warning system 140 can generate an audible and/or visual warning indicating the approaching signal. Further, the warning system 140 can be configured so that the warning signal changes, or increases in intensity as the signal is approaching. In some embodiments, a warning signal, or warning alarm can involve a continuous, alternating audible notification for the vehicle operator, along with an urgent flashing visual indication. In some embodiments, the warning signal can sound continuously until the operator presses an acknowledge button an interface, until the vehicle has come to a stop, or until the condition that caused the alarm has been cleared. In some embodiments, after a warning alarm has been acknowledged, the collision avoidance system 100 can initiate a reminder alert will sound periodically (e.g., every five seconds) until the vehicle has come to a stop, or the condition that originally caused the alarm has been cleared.

In some embodiments, the collision avoidance system 100 may use auto-braking system 130 and the warning system 140 together. For example, when the vehicle passes a red signal without stopping, the collision avoidance system 100 can alert the vehicle operator using the warning system 140, log the event description, timestamp, signal state, measured distance to the signal, and the vehicle operating conditions when the alarm was sounded. The collision avoidance system 100 can be configured such that the warning signal can be quieted if the vehicle operator presses a confirmation button, but to sound a periodic alert until vehicle is stopped or the signal is no longer red. If the vehicle doesn't begin braking within a predetermined distance or time (e.g., 50 feet or two seconds of passing the signal control point 40), the collision avoidance system 100 use the auto-braking system 130 to slow or bring the vehicle to a haft.

In some embodiments, the collision avoidance system 100 can record and log information about passing signal control points. For example, when a vehicle is passing a signal control point 40 indicating a green signal, the auto-braking system 130 may not be used. Rather, the event can be logged with an event description, timestamp, signal state, and vehicle operating conditions when the signal was passed. Moreover, when the vehicle passes a signal control point 40 indicating a yellow signal, the collision avoidance system 100 may alert the vehicle operator; log the event description, timestamp, signal state, measured distance to the signal, and the vehicle operating conditions when the alert was sounded.

Referring again to FIG. 4, the collision avoidance system 100 operates in connection with a supervisory component 500, which also communicates with an RFID reader 200 and a data collection system 300. In some embodiments, the RFID reader 200 can be connected to the collision avoidance system 100. The data collection system 300 can include, for example, a data storage device capable storing data and information that can be accessible via the supervisory component 500. The data collection system 300 can maintain a log of events, conditions, and rail vehicle information, and transmit that data to the rail network 50. The data collection system 300 can also comprise a database of information that relates to the rail vehicle, the rail track, and other rail vehicles associated with the rail network 50. Information obtained by the collision avoidance system 100 and/or the RFID reader 200 can be transmitted to stationary collision avoidance systems (e.g., collision avoidance systems installed on control signal points), which can in turn transmit the information to a rail network 50 (e.g., a wired network).

The RFID reader 200 can be configured to detect the RFID tags 20 that are installed or otherwise located along the railroad track. The RFID reader 200 can be configured to detect active tags, passive tags, or both. The RFID tags 20 can be serialized such that each RFID tag 20 is distinguishable from the other. In this manner, each RFID tag 20 can be associated with information about the location of the RFID tag. RFID tags 20 may also include or convey information relating to specific information about a given RFID tag 20. Such information includes work zone status, speed limit, grade, subterranean track segment, track reroute, and/or increased stopping distances. Temporary tags 20 may be installed to temporarily provide such information to the VMCS 10. Such information can be actually stored in a tag 20, or may be stored in a database. The unique identity of the tag 20 may be used to look up such information in a database. Such a database may be stored in the VMCS 10 or remotely. A VMCS 10 database may be updated via the rail network 50, for example, through an access point or reporting station 30.

For example, each serialized RFID tag 20 can be referenced in a database once read by the RFID reader 200. The database can be, for example, a part of the data collection system 300. The database can include information pertaining to the location of each RFID tag 20 associated with the rail vehicle separation control system 2. In this manner, each time the RFID reader 200 detects an RFID tag 20, the VMCS 10 can consult the database via the data collection system 300 to determine the location of the RFID tag 20, and thus, the location of the rail vehicle. Location may also be determined by interaction between a signal control point 30 and a map (for example, one stored in the VMCS 10 or remotely). If the signal control point 30 is known and the distance of the VMCS 10 from the signal control point is known, then location can be determined.

In some embodiments, the RFID reader 200 and/or the VMCS 10 can record a specific time at which each RFID tag 20 has been read. Thus, the speed of the rail vehicle can be determined based on the distance between two or more RFID tags 20, and the time elapsed between the RFID tag 20 detection. In some embodiments, the present technology can include, or can be interfaced with a speed measurements system on the vehicle (e.g., the speedometer). In this manner the present technology and the existing speed measurement system can serve as redundant features to improve the speed calculation of the vehicle. The system may also include a vehicle wheel speed sensor to independently determine the speed of the vehicle. These other speed determining components (speedometer and/or wheel speed sensor) may be used together with the RFID tag scanning system. Data from the speed determining components may be transmitted to other system components via an ad hoc, decentralized network. As another example, data generated by these other speed sensing components may be communicated to the rail network 50 similar to how the RFID tag scanning data is transmitted.

The RFID system (comprising the RFID reader 200 and the RFID tags 20) can also be used to determine the specific railroad track that the rail vehicle is traveling on. That is, each serialized RFID tag 20 can be associated with a particular railroad track such that the VMCS 10 and the rail vehicle separation control system 2 can be aware of which track each rail vehicle is traveling. This can be particularly useful if two railroad tracks are located parallel to one another and in close proximity. By reading individually serialized RFID tags located on the track itself, the present technology allows for the identification of the specific track or line that the vehicle is traveling on, providing an ability to ignore or bypass unnecessary collision warnings or auto-braking processes. The RFID tags 20 may operate in a 900 MHz ISM band.

Using the RFID reader 200 and tag 20 system of the present technology, a VMCS 10 can be aware of the vehicle's location and speed at any time regardless of its location. The location and speed information can be determined even when the rail vehicle is not able to access satellites and/or GPS functionality. In this manner, the present technology can be used in subterranean tunnels and/or subways to keep all vehicle operators and rail control systems apprised of the location and speed of each vehicle on the network, regardless of its location or access to GPS functionality.

The VMCS 10 may actually have several ways of determining speed. Such ways include determining speed by: wheel rotation rate; GPS information; RFID tag 20 scanning; and/or distance ranging over time (for example, using the UWB time-of-flight data over time). This may provide redundancy for robustness and also serve to allow the VMCS 10 to periodically recalibrate the estimated wheel size (which is used in conjunction with the wheel rotation rate to determine speed).

The supervisory component 500 can be connected remotely and/or wirelessly to the rail network 50. For example, the supervisory component can communicate with the rail network 50 via one or more reporting stations 30 that are installed or otherwise located along the railroad track. For example, when the rail vehicle passes a reporting station 30, the supervisory component 500 and/or the VMCS 10 can communicate information to the reporting station 30, and thus the rail network 50 wirelessly. For example, the reporting stations 30 and/or the VMCS 10 can include one or more antennae, receivers, transmitter, and/or transceivers that allow the reporting stations to send and receive information via Bluetooth, WiFi, radio signals, cellular signals, microwaves, infrared signals, lasers, ultrasonic signals, electromagnetic induction signals, or other modes of wireless communication. In this manner, the VMCS 10 can communicate information about the rail vehicle location, speed, separation between proximate vehicles, weather conditions, track conditions, and other relevant information to the rail network 50. The rail network 50 can use this information to manage and maintain an entire railway system to ensure that all rail vehicles on the railway system are operating at safe distances from one another and/or are properly distributed for timely transit operations.

Figure 6:
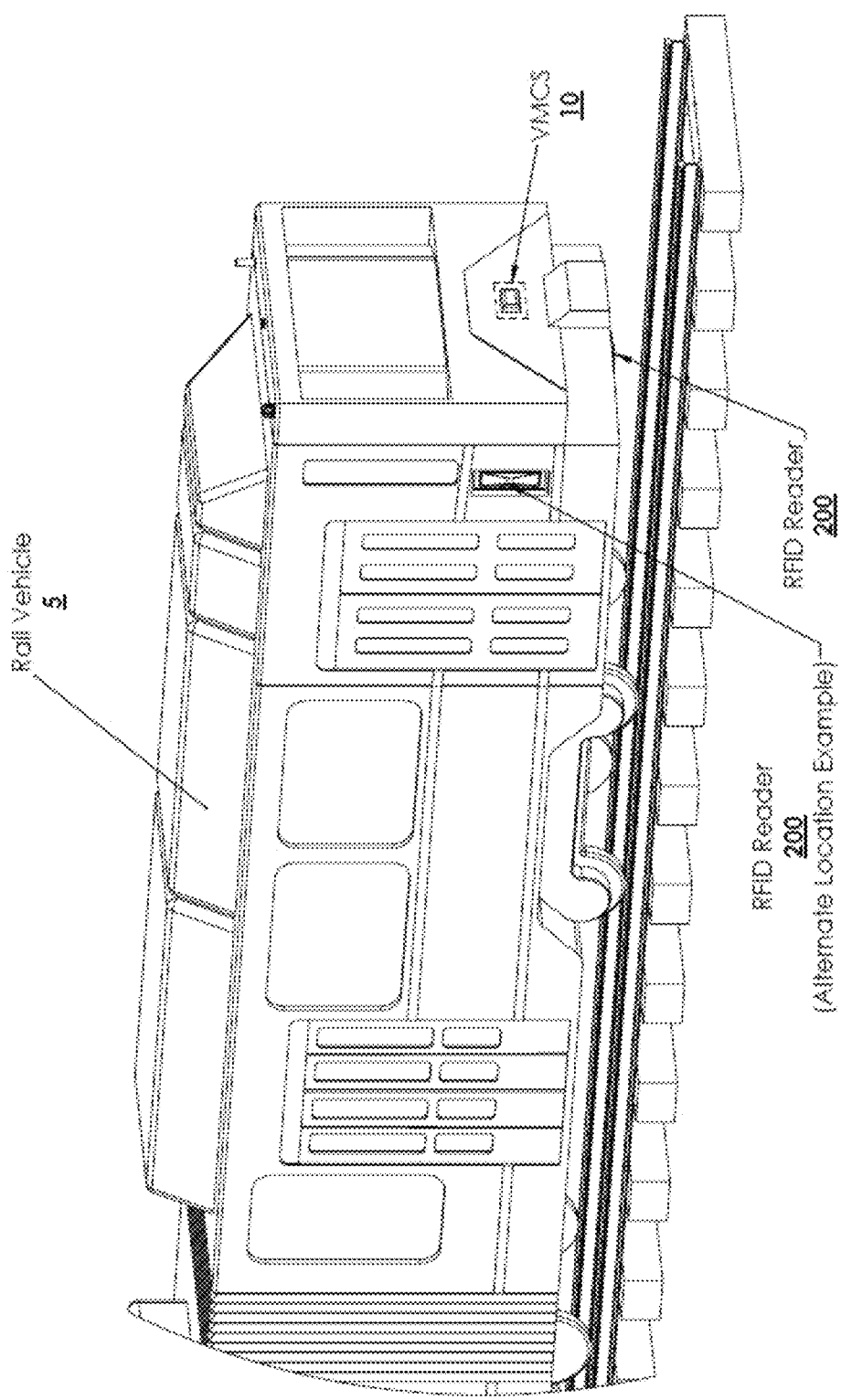
FIG. 6 shows a rail vehicle traveling on a rail line, the vehicle equipped with a control system in accordance with at least on embodiment of the present technology.

FIG. 6 shows an image of a rail vehicle 5 traveling on a rail line equipped with various components of a VMCS 10 of the present technology. The rail vehicle 5 can have a collision avoidance system 100 installed at a location on the front of the rail vehicle 5. An RFID reader 200 can also be installed at the front end of the rail vehicle 5, so that RFID tags located on the rails or ties can be read and detected. Other locations for the RFID reader 200 include the side, rear, or bottom of the vehicle 5. Placing the RFID reader 200 on the bottom of the vehicle may be particularly effective when RFID tags 20 are located on rail ties. As shown, the VMCS 10 can be installed on a rail vehicle as a module that comprises one or more components separate from one another.

In operation, the present technology can be used to control and enforce separation among rail vehicles. In some embodiments, the present technology provides a system that can detect a distance between the rail vehicle and a proximate rail vehicle on the rail track. In some embodiments, the present technology vehicle separation control system is adapted to detect the location of the rail vehicle, the speed of the rail vehicle, and the distance between the rail vehicle and the proximate rail vehicle when the rail vehicle is located in a subterranean tunnel. The present technology can include systems that have an auto-braking system 130 that automatically reduces the speed of the rail vehicle when the distance between the rail vehicle and the proximate rail vehicle on the rail track is within a predetermined limit. The predetermined limit can be calculated based at least in part on the speed of the rail vehicle. For example, where a rail vehicle is traveling at a high rate of speed, it will take a greater distance to bring the vehicle to a stop. Accordingly, in such a circumstance, a predetermined distance can be relatively high to ensure that the rail vehicle can come to a complete stop before colliding with another vehicle.

Certain embodiments of the present technology relate to systems mounted or mountable on a rail vehicle. Moreover, some embodiments of the present technology relate to rail vehicle separation control systems that include or incorporate a VMCS 10 in addition to other features, including but not limited to: a rail network 50 maintaining information relating to the location and speed of rail vehicles on the railroad track; one or more of serialized RFID tags 20 mounted at locations along the railroad track; and one or more reporting stations located along the railroad track, the reporting station operable to communicate with the rail network 50. The VMCS 10 can obtain vehicle information relating to the railroad track that the rail vehicle is traveling upon and the rail vehicle location based on the GPS information and/or serialized RFID tags 20 detected by the RFID reader 200. Speed may be determined by these subsystems and/or by the wheel rotation rate. The VMCS 10 can then communicate the vehicle information to the rail network 50. In some embodiments, the reporting station can be a signal control point operable to display signals viewable by an operator of a rail vehicle traveling along the railroad track.

Certain embodiments of the present technology also provide methods of enforcing rail vehicle separation. In some embodiments, the methods involve determining the speed and location of a rail vehicle traveling along railroad track.

FIG. 7 is a flow diagram 700 depicting a method for determining the speed and location of a rail vehicle in accordance with at least one embodiment of the present technology. The method may be performable using the structures and functions described herein. The steps illustrated in the flow diagram 700 may be performable at least in part by one or more processors, such as the processor(s) in the VMCS. Furthermore, the steps illustrated in the flow diagram 700 may be performable in a different order, or some steps may be omitted according to design and/or preferences. The steps illustrated in the flow diagram 700, or a portion thereof, may be performable by software, hardware, and/or firmware. The steps illustrated in the flow diagram 700, or a portion thereof, may also be expressible through a set of instructions stored on one or more computer-readable storage devices, such as RAM, ROM, EPROM, EEPROM, flash memory, optical disk, magnetic disk, magnetic tape, and/or the like.

As shown in FIG. 7, the flow diagram 700 includes, at step 710, detecting a first serialized RFID tag located along a railroad track. The first serialized RFID tag can be detected, for example, with an RFID reader mounted on the rail vehicle. The first serialized RFID tag can have a serialized identifier, for example, that corresponds to location information of the RFID tag along the railroad track. In this manner, a VMCS can reference the serialized RFID tag in a database to obtain information about the RFID tag's (and thus the rail vehicle's) location along the railroad track. In some embodiments, at step 710, the method may include noting a time (e.g., a first time n) that the serialized RFID tag was read.

At step 720, a second serialized RFID tag is detected using the RFID reader. The second RFID tag can also have a serialized identifier that can be referenced in a database to obtain information about the RFID tag's location along a railroad track. In some embodiments, at step 720, the method may include noting a time (e.g., a second time t2) that the serialized RFID tag was read.

At step 730, the first and/or second serialized RFID tag are referenced in a database. In this manner, at step 730, information can be obtained about the location of the rail vehicle at the first time n, and the location of the rail vehicle at the second time t2, based on the times that the first and second RFID tags were read by the RFID reader. In some embodiments, the RFID tags may be referenced by a latitude and longitude coordinate system. Additionally and/or alternatively, in some embodiments, each RFID tag may be associated with location information that is referenced with respect to the railroad tracks. For example, the RFID tags can be identified as a certain distance (e.g. 5 miles, 2390.81 feet) from a reference point, such as a rail station, a reporting station, railroad tie, etc.

At step 740, the flow diagram 700 can include determining vehicle location information. For example, at step 740, the flow diagram 700 can determine a precise or approximate vehicle location based on the location information associated with the RFID tags recently read by the reader based on the information referenced in the database. In some embodiments, the location information can be based on geographic coordinates (e.g., latitude and longitude coordinates) or a position relative to a reference point, for example. As another example, location information may correspond to a mile-marker value (e.g., 21.3 miles).

At step 750, the flow diagram 700 determines the vehicle speed information. The vehicle speed information can be based on the locations of the RFID tags read by the RFID reader, the distance between the RFID tags, and the times at which the RFID tags were read. In this manner the method can determine and continually update the speed of the rail vehicle by dividing the distance between two detected RFID tags by the time elapsed between the points when they were detected. In certain embodiments, this can provide a validation, or redundancy for the on-board speed measurement system (e.g., the speedometer). That is, the RFID reader can be used as a cross-check to the on-board speed measurement system. If it is determined that there is a significant disagreement over the course of multiple measurement cycles, the technology may record a fault and notify the rail network. In this way any problems can be diagnosed and repaired.

The rail vehicle location and speed information can be logged, stored, and/or maintained in a database. For example, in some embodiments, the rail vehicle speed and location information can be logged in a data collection system that is a component of the VMCS as rail vehicle information.

In some embodiments the method also involves determining the distance between the rail vehicle and another rail vehicle. For example, in some embodiments, a VMCS can be used to send signals, and receive signals from other VMCS devices mounted on proximate rail vehicles. In this manner, a time of flight technology can be used to determine a separation distance between the rail vehicles. In some embodiments, a GPS unit can be used to determine the separation distance between two or more rail vehicles. And in some embodiments, the method may use a combination of time of flight and GPS technology to more accurately detect and determine a distance between rail vehicles operating on a common rail track. The separation distance information can also be logged, stored, and maintained in a database, for example, a data collection system component of a VMCS as rail vehicle information.

In some embodiments, other information can be obtained and recorded by the VMCS. For example, information about weather conditions, rail track conditions, rail track problems or issues, signal control point conditions, instructions, or issues, and/or passing rail vehicle issues can be detected. This information can also be logged, stored, and maintained in a data collection system component of a VMCS as rail vehicle information.

Logged information may be stored at the VMCS in non-volatile memory. Logging may involve two event categories: incident and activity. Incident logging may record catastrophic events (for example, a collision), whereas activity logging may be used for all other events (for example alarm-generating events or braking events).

At step 760, the method communicates rail vehicle information to a rail network. The information can be communicated, for example, by transmitting information from a VMCS to a reporting station located along a rail track.

In some embodiments of the present technology, the method can involve generating a signal to alert a vehicle operator of an approaching stopping signal, an approaching vehicle, or of other noteworthy events, in particular, events that could result in a collision or accident such as excessive speed. In some embodiments, the present technology may automatically brake or reduce the speed of a rail vehicle. For example, in some aspects, methods could involve initiating an auto brake feature that automatically applies brakes to reduce the speed and/or stop the rail vehicle.

Figure 8:
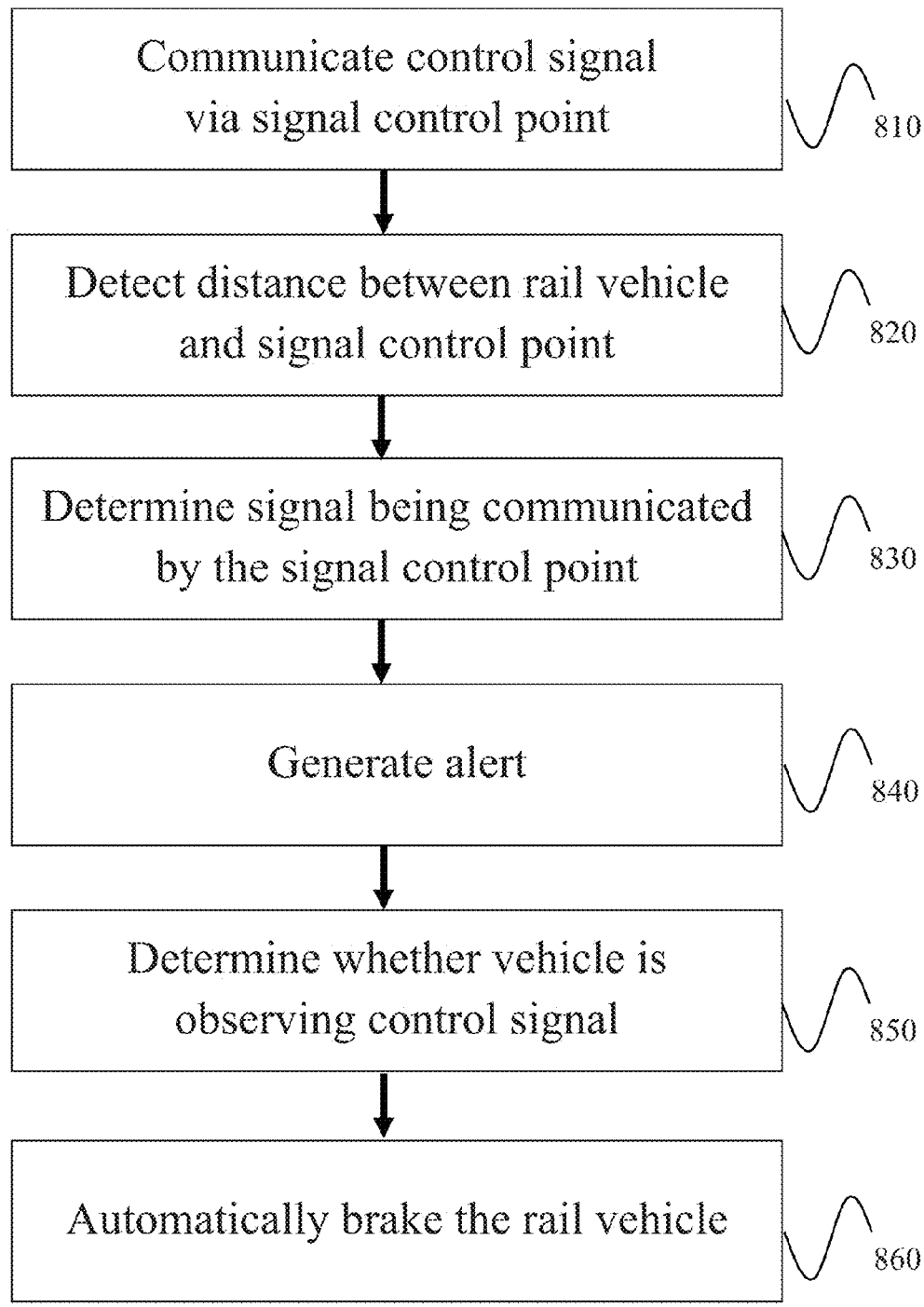
FIG. 8 is a flow diagram of a method for enforcing rail vehicle adherence to control signals in accordance with at least one embodiment of the present technology.

FIG. 8 is a flow diagram 800 depicting a method for enforcing rail vehicle adherence to rail control signals in accordance with at least one embodiment of the present technology. The method may be performable using the structures and functions described herein. The steps illustrated in the flow diagram 700 may be performable at least in part by one or more processors, such as the processor(s) in the VMCS. Furthermore, the steps illustrated in the flow diagram 700 may be performable in a different order, or some steps may be omitted according to design and/or preferences. The steps illustrated in the flow diagram 700, or a portion thereof, may be performable by software, hardware, and/or firmware. The steps illustrated in the flow diagram 700, or a portion thereof, may also be expressible through a set of instructions stored on one or more computer-readable storage devices, such as RAM, ROM, EPROM, EEPROM, flash memory, optical disk, magnetic disk, magnetic tape, and/or the like.

As shown in FIG. 8, the flow diagram 800 includes, at step 810, communicating a control signal via a signal control point. For example, the signal control point can communicate a "stop" signal by presenting a red light, a "proceed" signal by presenting a green light, or a "proceed with caution" signal by presenting a yellow light. In some embodiments, the control signal may include a speed limit for the rail vehicle. The control signal can be communicated to passing rail vehicles, to a rail network, and to other signal control points, for example, via wireless communication devices.

At step 820, the flow diagram 800 detects a distance between the rail vehicle and the signal control point. For example, the flow diagram 800 can employ a collision avoidance system to detect a distance between the rail vehicle and the signal control point using time of flight techniques. That is, in some embodiments, the step of determining a distance can be based on the time it takes a signal to travel between the transponder sensor modules on the rail vehicle and signal control point, for example. The collision avoidance system can comprise, for example, one or more transponder sensor modules installed on each of the rail vehicle and the signal control point.

In certain embodiments, at the step 830, the flow diagram 800 can include determining whether the rail vehicle is approaching a signal control point indicating or communicating a control signal. A control signal may be a "stop" signal or a signal communicating a speed limit for the rail vehicle. For example, the flow diagram 800 can use a collision avoidance system to detect a distance between the rail vehicle and a signal control point to determine whether the signal control point is indicating a "stop" or other signal. For example, the rail vehicle can communicate with the signal control point and/or a rail network using a supervisory component to determine the signal that the signal control point is currently indicating. If it is determined at step 830 that the rail vehicle is not approaching a signal, the method can cycle back to step 820, for example, and continue detecting the distance between the rail vehicle and upcoming signal control points. If it is determined that the upcoming signal control point is indicating a "proceed" signal, then the flow diagram 800 can allow the vehicle to proceed past the signal without any warning or suggestion to slow the vehicle.

If it is determined that the signal control point is indicating a "stop" signal, or any other signal suggesting that the rail vehicle reduce its speed (such as a speed limit signal), then the flow diagram 800 can proceed to step 840 and generate a warning signal. For example, step 840 can involve generating a warning signal via a warning system component of a collision avoidance system on the rail vehicle. In certain embodiments, the warning system can issue a series of beeps or alarms that will continue until the vehicle operator acknowledges the signal, for example, by pressing a button or communicating a signal acknowledgement, or until the vehicle reduces its speed or comes to a stop. In certain embodiments, the warning signal can be a progressive warning signal that increases in volume, duration, repetition rate, and/or frequency as the signal control point draws nearer. In this manner, the warning signal can be used as a failsafe to ensure that the vehicle operator recognizes the signal and thereby take steps to slow and/or stop the vehicle. Warning signal(s) may also be visual.

At step 850, the flow diagram 800 determines whether the vehicle is observing the control signal. For example, at step 850, the flow diagram 800 can determine, based on factors such as the vehicle speed, vehicle location relative to the rail signal, and rail track conditions whether it is possible for the vehicle to come to a stop in a safe manner. For example, given the speed of the vehicle, the track conditions, and the distance to the signal control point, an appropriate braking distance or speed reduction distance may be determined. This is a distance that allows for safe braking by the time the vehicle reaches the signal control point. If the vehicle does not begin slowing down at an appropriate rate once the distance is reached, then it can be determined that the vehicle is not observing the control signal.

In some embodiments, step 850 may determine that the vehicle is not observing the stop signal when the vehicle passes the signal control point (or any predetermined point along the rail track) at any speed. If it is determined that the vehicle is indeed observing the stop signal, the flow diagram 800 can cycle back to step 830, 820, and/or 810 and depending on the location of the train and the conditions of the signal control points. In some embodiments, step 850 may determine that the vehicle is not observing the speed limit signal when the vehicle passes the signal control point (or any predetermined point along the rail track such as an RFID tag).

According to one technique, a database of trackside RFID tags (each with a unique ID) is maintained. Each RFID tag (or a portion thereof) has an associated speed limit that is stored in the database. As the vehicle reaches an RFID tag, the speed of the vehicle is checked against the appropriate speed indicated by the database for the given RFID tag. If the vehicle speed exceeds the given speed limit for that tag, then it can be determined that the vehicle is not observing the speed limit. The database may store different limits for each RFID tag according to other conditions such as weather, construction, or time-of-day. Alternatively, the database may store one or more limits for each RFID tag that can be adjusted according to such other conditions. For example, if the track is we or there is rain, a speed limit value for an RFID tag may be reduced by a percentage, such as 20%. The database may be stored locally on the vehicle or remotely at a rail control system.

According to another technique, the distance of an approaching vehicle (for example, another vehicle in front of the vehicle) may be determined. The rate of change of the distance may also be determined. Based on the distance, the rate of change of the distance, the speed of the vehicle, the speed of the other vehicle, and/or the track conditions, it may be determined that there is a risk of the vehicles colliding. Accordingly, a warning (an alert may be a type of warning) may be generated.

If a warning is being generated, the failure of the vehicle to observe control points, speed limits, or recognize an approaching vehicle may escalate the level of the warning— e.g., causing a louder warning or a brighter, different colored warning (for example, go from yellow to red). If a warning is not being generated, then failure to observe control points or speed limits may cause a warning signal to be initiated.

If it is determined at step 850 that the rail vehicle is not observing the control signal, speed limit, or approaching vehicle, then the flow diagram 800, at step 860, automatically brakes the vehicle, for example, using an auto-braking system. In some embodiments, the auto-braking feature can be applied until the rail vehicle comes to a complete stop, or until the vehicle speed is below a determined threshold (e.g., below 2 miles per hour or below the speed limit for that portion of the track), depending on the conditions and the situation. In some embodiments, once the vehicle has been brought to a stop or otherwise has been brought into compliance with the control signal, any warning signals currently generated (e.g., by step 840) may cease or be altered to notify the vehicle operator of the current state of events.

In the event that the VMCS automatically stops the vehicle, the brake can be continually applied until the operator acknowledges that he or she is prepared to again assume control of the vehicle. This acknowledgement can be accomplished by pressing a confirmation button on the user interface. When pressed, the brake can be released and system operation is returned to normal. Note that the braking event and the acknowledgement events and times can be logged.

The VMCS may provide a way for status messaging to be uploaded to the rail network. Access points may be located periodically along the track (for example, vehicle storage yards or turn-around points). At these points, information may be transferred to and from the vehicle and rail network.

The systems and methods disclosed herein can provide additional layer(s) of protection for transit operations by warning the vehicle operator when operating rules are violated. If necessary to restore safe operating margins, the VMCS can cause the vehicle slow or stop using the vehicle's full service brake. The protection provided by these systems and methods can include signal compliance, speed limit compliance, vehicle-to-vehicle collision avoidance, operations and incident recording, work-zone temporary speed limits, vehicle location tracking, and precision station stopping. The techniques described herein can function by independently monitoring operating conditions such as vehicle speed, signal indications, and local speed restrictions on the transit line.

The techniques can operate through the use of multiple sensing and communication technologies which are mounted on the vehicle and at strategic wayside locations. The vehicle-side portion of the system can operate autonomously and make internal operational decisions without requiring a central server. The techniques can adapt to a transit system's existing operating rules and may not require the addition of restrictive block controls or additional vehicle spacing, avoiding adverse impact on existing system throughput. The techniques can operate as an overlay to the existing safety controls in transit systems by interfacing in a non-invasive means with legacy vital signals. This system enhances safety by providing warnings and/or actions which may include automatic braking in the event the transit vehicle operator fails to comply with operating rules and procedures. The techniques may comply with IEC61508 SIL 3.

The techniques may be used as a safety enhancement to supplement existing procedures and safe operating principles that transit vehicle operators are trained to follow. In order to avoid compromising the existing "safety net" already achieved with established operating behaviors, the techniques disclosed herein may to diminish or suppress operator responsibility. For example, instead of notifying the operator when the vehicle is approaching a track signal which is displaying a red (stop) indication, the techniques may not indicate a warning simply because the vehicle is approaching a red signal. Instead, the techniques may wait until the VMCS calculates that the approach speed to the red signal is beyond what has been determined as a reasonably safe operating margin. Only when vehicle operation has exceeded the established safe operating parameters will the techniques indicate a warning. If the safe operating margin continues to deteriorate because the operator fails to immediately slow the vehicle to a stop, the techniques can escalate intervention by automatically causing application of vehicle brakes until the vehicle comes to a stop.

This approach may keep the vehicle operator accustomed to being the primary facilitator of safe operation. In an alternative implementation, the techniques were to warn the operator every time the vehicle was approaching a condition that requires slowing or stopping, the operator may eventually become complacent. In time, under this alternative scenario, the operator may come to depend upon the system to maintain safe operation instead of being vigilant and observant. This alternative approach may compromise the intended safety enhancement intended.

According to one technique, in order to assure that the operator retains operational responsibility, the methods and systems keep a log of the conditions for each event where it intervenes by indicating a warning or by applying vehicle brakes. This log can include the nature of the intervention, the justification for the intervention, the date, time, vehicle ID, vehicle speed, vehicle direction of travel, operating track, location, and, where applicable, the distance to the signal, other vehicle, or the speed limit for the track segment. Audits of logs may highlight if a particular operator is in need of additional training or discipline.

According to a technique, the system may operate using a peer-to-peer data communications network (e.g., an ad-hoc network) between vehicles and signals. As components come into communications range, they enter the network. Such a decentralized approach may allow each vehicle to determine its safe operating envelope using only the necessary local inputs from signals and other vehicles.

Figure 9:
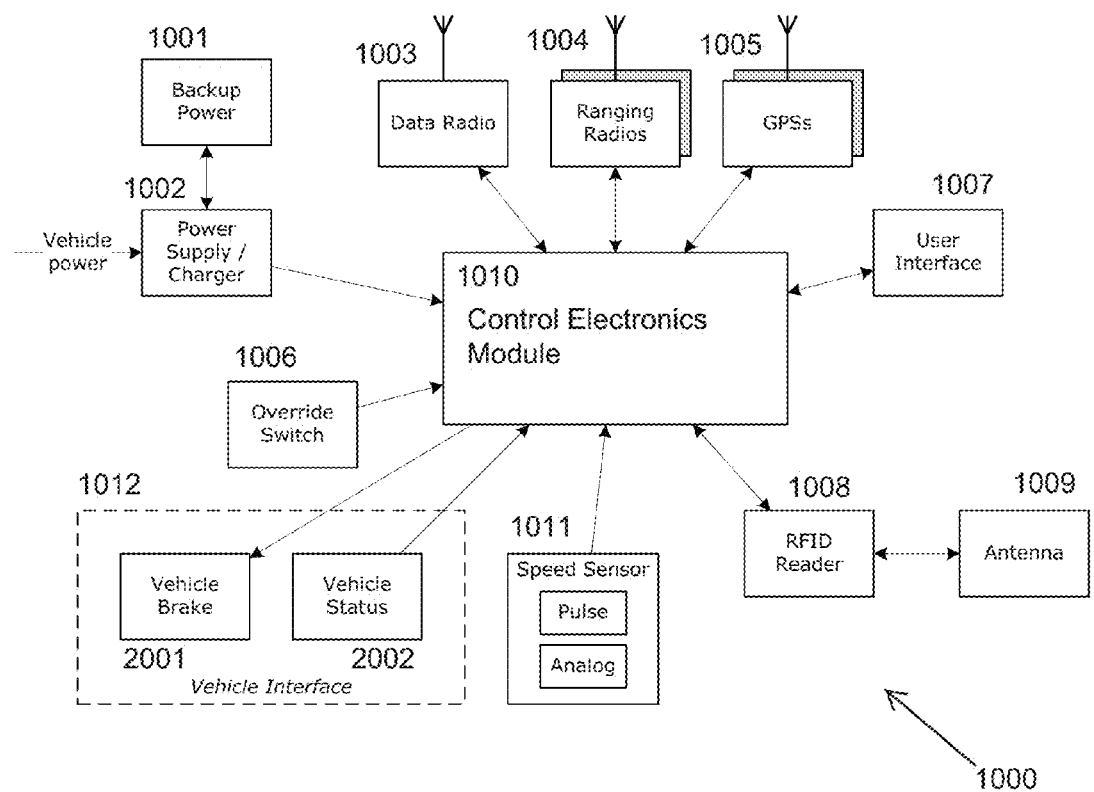
FIG. 9 illustrates a block diagram of a vehicle mounted control system used in accordance with at least one embodiment of the present technology.

FIG. 9 illustrates a vehicle management control system 1000 (or vehicle-mounted subsystem), and may be similar to VMCS 10. For example, either the VMCS 1000 or VMCS 10 may be adapted to perform the techniques disclosed herein. The VMCS 1000 may include a backup power module 1001, a power supply/charger 1002, a data radio 1003, one or more ranging radios 1004, a GPS radio 1005, an override switch 1006, a user interface 1007, an RFID reader 1008, an RFID antenna 1009, a control electronics module 1010, a speed sensor 1011, and/or a vehicle interface 1012. The control electronics module 1010 may include one or more processors (or, for simplicity, a processor) and one or more memories. The control electronics module 1010 may control the operations of peripheral components and receive data from them as well.

The VMCS 1000 may include a power supply 1002 and/or charger and a backup power source 1001 (e.g., batteries) rechargeable by the charger 1002. The power supply 1002 may provide suitable electrical power to the remainder of the VMCS 1000. The power supply 1002 may receive power from the vehicle.

The data radio 1003 may be a peer finder. The data radio 1003 may be capable of detecting other peers, such as another VMCS 1000, a signal control subsystem, a temporary control subsystem, or an access point, all of which are discussed below. Once peers have been identified, a peer-to-peer network may be created. The peer-to-peer network may operate independently of a central network, such as the rail network discussed above.

The control electronics module 1010 may determine or recognize the presence of peers detected by the data radio 1003. The data radio 1003 may also serve to transfer data to and from other peers. The data network may be a spread-spectrum network and may employ frequency hopping. Such techniques may improve signal quality and robustness of the network. The data network may share speed and location of the vehicle with the other peers. This may facilitate determining a proper separation distance between the peers (be they other VMCSs or signal control subsystems). The data network may allow wireless data uploads of daily operation logs and fault reports, for example, with an access point. Information may be transmitted to a central network, either through another peer or directly, that includes operating data of the vehicle (e.g., location and speed) or faults that have been detected.

Once another peer is added to the network, the control electronics module 1010 may operate one or more ranging radios 1004 to communicate with the other peers. The radios may be described as "ranging," because they may operate in conjunction with the control electronics module 1010 to determine a distance between the VMCS 1000 and a given peer. Distance may be determined by time-of-flight of the communications with another peer. For example, a signal may be sent to a peer and it may be returned, and the time-of-flight may be calculated, thereby providing information about the distance to the peer.

One particularly useful technology for the ranging radios 1004 is an UWB network. UWB may provide a wide bandwidth distance measurement signal that can be used to measure distance, for example, within inches. UWB may be resistant to multipath distortions. Narrow-band time-of-flight distance measurement systems may suffer from multipath distortion. UWB may be compatible with varying operating environments including ones with buildings and walls (which cause reflections), curved tunnels, and underground. In addition to determining range information, the UWB network may be used to communicate data, such as: the VMCS's unique ID, a signal indication, a track number, a track direction, the vehicle speed, the vehicle direction of travel, or GPS information (position information and/or GPS clock value).

The GPS radio 1005 may be capable of receiving GPS information from satellites. This information may be translatable into a position by the control electronics module 1010. The GPS operating frequency may be 1.575 GHz (civilian frequency). The GPS information may include absolute location and time/date information. The location information may be used to derive speed of the vehicle. The location and speed information may be used for collision avoidance techniques as discussed herein. The position/speed information may also be communicated to other peers or to a central network. The speed data may be used to automatically compensate for wheel wear when determining speed via the speed sensor 1011 discussed below. The time information may be used for data timestamps as well as local real-time clock calibration to allow accurate logging of event times.

The VMCS 1000 may include an override switch 1006 to override operation of the VMCS 1000. In the override state, the vehicle may return to its native functioning (i.e., the functioning of the vehicle prior to installation of the VMCS 1000). The override switch 1006 may be a physical actuator or an electronic signal.

The user interface 1007 may include one or more displays, input devices, or speakers. The user interface may receive inputs through the input device(s) from an operator. System information may be displayed on the display(s). Alerts may also be displayed on the display(s). The speaker(s) may also produce alerting sounds.

The RFID reader 1008 may operate with its antenna 1009 (collectively, RFID subsystem) to scan RFID tags located outside of the vehicle (e.g., trackside). The RFID network may operate in the 900 MHz ISM band. The tags may be passive or active tags. When the RFID reader 1008 approaches a tag, the contents of the tag may be retrieved and processed by the control electronics module 1010. The RFID tag may contain a unique ID. The control electronics module 1010 may use that unique ID to retrieve additional information about the tag from a database (e.g., a database stored in the memor(ies) of the control electronics module 1010. Such information (which may also be directly stored on the RFID tag) may include location, speed limit, track direction, distance to a control signal subsystem, or the like. If the speed of the vehicle is greater than the indicated speed limit, then feedback may be provided through the user interface 1007 (for example, alerting the operator visually or through sound that a speed limit has been exceeded).

The RFID subsystem may be employed to allow the VMCS 1000 to determine when the vehicle is a predetermined distance away from an upcoming signal along the direction of travel. This may provide a calibration check of the UWB and GPS subsystems. By locating a particular RFID tag on the track at a consistent distance before a track signal, or at a distance noted in the data stored in the RFID tag, the distance measurement accuracy may be periodically verified. In the event the RFID information indicates that the vehicle is approaching a particular signal but that signal is not being detected (for example, by radios 1003 or 1004), it may be determined that there is a problem such as a fault in the VMCS 1000 radios or a fault in the radios of the missing peer. Such information may be logged or reported to the operator through the user interface or reported to another network such as a central network.

The speed sensor 1011 may sense the number and/or rate of revolutions of one or more wheels on the vehicle. This component may be added onto an existing vehicle (prior to installation of the VMCS 1000), or may already be installed on the existing vehicle. The speed sensor may be a magnetic or optical sensor that, for example, measures a given number of pulses per wheel rotation. The speed sensor may also provide information relating to the direction of wheel rotation. The speed sensor may output a digital or analog signal (e.g., voltage with the magnitude being proportional to speed).

The VMCS 1000 may include a vehicle interface 1012 that interfaces with existing vehicle controls and data. The vehicle interface 1012 may interface with the vehicle's existing brake system. The brake system interface may include a switch that interrupts the vehicle's brake loop. The vehicle may include a fail-safe feature that automatically engages the brake when the brake loop is interrupted. The VMCS 1000 can leverage this vehicle feature by opening the brake loop when a braking event is determined by the control electronics module 1010.

The brake system interface may include a switch. An exemplary switch may be, for example, a relay (solid state or mechanical). The first contact of the switch may connect to a first side of the brake loop and the second contact may be connected to a second side of the brake loop. To install the switch, an installer may find a suitable conductor on the brake loop, cut it, and then install the switch contact to each side of the cut conductor. It may also be possible to install the switch through other techniques. For example, an existing connector (e.g., terminal) can be removed from a contact on the existing vehicle and then moved to the connector the first contact on the switch. A jumper from the second contact of the switch may be run back to the original contact on the existing vehicle.

The processor of the control electronics module 1010 may cause the switch to open upon a braking event, thereby disconnecting the first contact from the second contact. This will cause the vehicle's braking algorithm and implementation to activate. The control electronics module 1010 may cause an alert to be generated by the user interface 1007 (visual and/or auditory) that there has been an automatic braking event (i.e., not a braking event caused by the operator's direct interaction with a braking actuator).

The control electronics module 1010 may then close the switch after expiration of the braking event. Such expiration may occur after a given period of time (e.g., one minute) and/or upon a change in status of an operator-controlled input. For example, after a suitable period of time, the control electronics module 1010 may receive an input from the user interface 1007 indicating that the braking event should end. This may occur through an operator acknowledging and ending the braking event by interacting with the user interface 1007.

Figure 10:
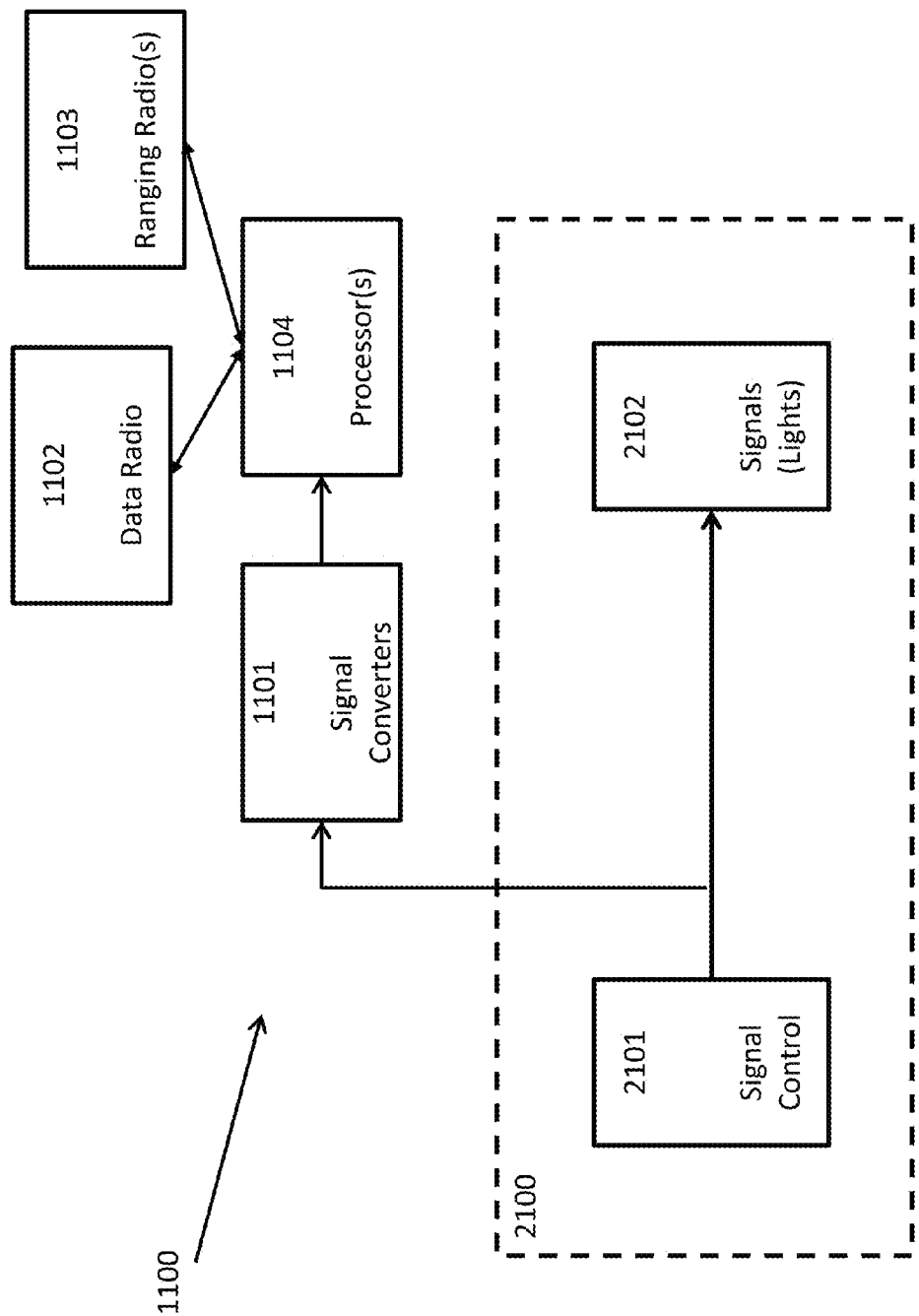
FIG. 10 illustrates a block diagram of a control signal interface subsystem in accordance with at least one embodiment of the present technology.

FIG. 10 illustrates a control signal interface subsystem 1100 that interfaces with a signal control 2100. FIG. 10 and its functions may be similar to those discussed above in context of the signal control point 40. The control signal interface subsystem 1100 may be added to an existing signal control 2100. The signal control 2100 may include signal controls 2101 and signals 2102. The signal controls 2101 may cause illumination of appropriate signals 2102. The signal control subsystem 1100 may interface with the signals through one or more signal converters 1101. This information may be received by one or more processors 1104. One or more of the signal converters 1101 may also provide power to the processor 1104 (not shown). The signal converters 1101 may also include isolation circuitry, for example, to reduce the risk of a ground fault through the control signal interface subsystem 1100. The data radio 1102 may operate in a similar fashion to data radio 1003 of the VMCS 1000 discussed above. The ranging radio(s) 1103 may operate in a similar fashion to ranging radio(s) 1104 of the VMCS 1000 discussed above. The signal information may also be communicated to peers through the data radio 1102 and/or ranging radio(s) 1103.

The VMCS 1000 and control signal interface subsystem 1100 may operate in the following manner. The VMCS 1000 is mounted on a vehicle travelling towards a control signal to which a control signal interface subsystem 1100 is mounted. The VMCS 1000 searches for peers through the data radio 1003 (e.g., spread-spectrum frequency hopping data network). The control electronics module 1010 detects and identifies the control signal interface subsystem 1100 as a peer and adds it to the VMCS 1000 recognized peer list.

The VMCS 1000 then communicates with the control signal interface subsystem 1100 via the ranging radio(s) 1004 and 1103 (e.g., UWB network). The VMCS 1000 receives control signal status information from the control signal interface subsystem 1100 (e.g., what signal light is being displayed) via the ranging radio(s) 1004, 1103 or the data radios 1003, 1102. The VMCS 1000 determines the time-of-flight of one or more communications (e.g., single-segment or round-trip communications). The control electronics module 1010 of the VMCS 1000 then calculates the distance between the VMCS 1000 and the control signal interface subsystem 1100 based on the time-of-flight. The distance may also be calculated (for example, redundantly) based on GPS data. The distance may also be calculated based on RFID tag location data in addition to the known speed of the vehicle. For example, given a known RFID tag location, the distance of a vehicle can be determined by continuously tracking the speed of the vehicle after passing the RFID tag location.

An alert may be generated via the user interface 1007 by the control electronics module 1010 if the distance between the VMCS 1000 and the control signal interface subsystem 1100 is less than a threshold. This distance threshold can vary (e.g., vary in real-time) according to a number of factors, such as: speed of vehicle; rate of change of speed of vehicle (acceleration or deceleration); track speed limit; track conditions (e.g., icy or we tracks); temperature; track grade (e.g., steepness); work zone status; and/or the like. The threshold is exceeded when the VMCS 1000 determines that, given the relevant factors, the distance is becoming too close with the control signal interface subsystem 1100. Exceeding this threshold, or a different threshold, may cause the VMCS 1000 to cause the vehicle braking system to initiate (e.g., by interrupting the vehicle brake loop). Thresholds for alert and/or an automatic braking event may be the same or different. For example, the VMCS 1000 may only cause an alert when the vehicle operating conditions and position are getting near to a dangerous condition. A braking event may be caused only when the conditions and position actually become dangerous. A different type of alert may be generated when an automatic braking event takes place. According to one technique, alerts can be initiated upon exceeding a first threshold and the alert can continue escalating in severity over time if no corrective action is taking place. The alert can escalate until the situation becomes sufficiently dangerous that the vehicle may not be capable of safely stopping before the control signal (or such lack of capability is sufficiently imminent). The alert can then escalate further or change character once an automatic braking even takes place.

The VMCS 1000 may employ alerts and/or automatic braking events to promote compliance with rules. A rule may have one or multiple components. Such rules may be associated with control signal states. Different control signal states may include red, yellow, green, double red, or double yellow. Each control signal state may have an associated set of behaviors required for vehicles observing such a state. A red signal may mean the following: stop the vehicle; remain stopped for a period of time (e.g., one minute); and proceed after stopping at a restricted speed (e.g., 10 miles per hour or less until the next signal). A yellow signal may mean proceed with caution and be prepared to stop at the next signal. A green signal may mean proceed at an authorized speed. A double red (or red over red) may mean stop and stay only until an authorized person hand flags the vehicle past the signal. A double yellow (or yellow over yellow) may mean stop and then proceed at a restricted speed with caution (because, for example, a station ahead is occupied by a train).

Besides color coded signals, other signals may report system problems. For example, an "imperfect display" signal may indicate if one or more lights on the control signal are malfunctioning. For example, a control signal generally has only one signal illuminated—no more, no less. If no signal is illuminated, or if more than one signal is illuminated simultaneously, then there may be an imperfect display. Proper response to such a signal may depend on which type of light is defective. An "imperfect display at an interlocking" may indicate that the vehicle must stop and should not proceed unless authorized by an authorized person. An "imperfect display at an automatic block signal" may indicate that the vehicle should stop, wait for a duration of time (e.g., one minute), and then proceed at a restricted speed (e.g., not greater than 10 miles per hour).

The VMCS 1000 may promote compliance with such signals by monitoring a vehicle's behavior as compared to a rule. If one or more components of a rule are violated, then the VMCS 1000 may cause an alert and/or braking event. For example, if a signal is red, then a rule may include the following components: (1) come to a safe stop before reaching the signal; (2) wait for one minute; and (3) proceed after stopping at a speed of 10 miles per hour or less. The VMCS 1000 enforces compliance with each one of these components. As discussed above, the VMCS 1000 can enforce compliance of the first component of coming to a safe stop before reaching the signal. Then, the VMCS 1000 can ensure that the vehicle remains stopped for one minute (other intervals can also be chosen). If the vehicle begins moving prior to the expiration of the one minute timer, then the VMCS 1000 can cause an alert and/or automatic braking event. After stopping for one minute, the VMCS 1000 can then cause an alert and/or automatic braking event if the vehicle does not comply with the third component of the rule—proceeding at a reduced speed of 10 miles per hour or less. Thus, the VMCS 1000 can monitor and enforce complex vehicle behavior for rules that require safe stopping, stopping duration, or reduced vehicle speed. Rules may also involve maintaining safe separation distances from other vehicles. For example, a rule may adjust a safe separation distance.

The VMCS 1000 may also communicate with an access point (e.g., via the data radio 1003 and/or ranging radio(s) 1004). Data logs including vehicle incidents (e.g., alarm-generating incidents) and speed-limit compliance may be stored in the control electronics module 1010. This information can be communicated with the access point and then forwarded to a centralized network (e.g., a rail network). The access point may also communicate data to the VMCS 1000. Such data may include, for example, track conditions, weather, and/or an updated RFID tag database (which may include location, work zone status, speed limit, etc.). In addition to communicating this information wirelessly, it may be communicated with an access point via a physical connector (for example, connected to an access port on the VMCS 1000).

In addition to communicating with a control signal interface subsystem 1100, the VMCS 1000 may also communicate with another VMCS on another vehicle. Such VMCS-to-VMCS communications may be implemented as discussed with respect to the VMCS-to-control signal interface subsystem communications. The VMCS-to-VMCS communications may be employed to determine safe vehicle separation distances. Thresholds and automatic braking events may be determined in similar fashion as those determined in the context of the VMCS 1000 interacting with the control signal interface subsystem 1100. To avoid collisions by maintaining adequate vehicle-to-vehicle separation, braking event thresholds may be determined by accounting for factors of the remote vehicle, such as the remote vehicle's speed, rate of change of speed, direction, or the like. As more peers are added to the network (be they other VMCS's or control signal interface subsystems), new safe operating thresholds can be determined for each new peer.

Other types of peers are also possible. For example, a peer may be a temporarily fixed unit. An example is a maintenance crew's portable unit or a temporary slow-down marker. These types of peers may be constructed and function in a fashion similar to that of the control signal interface subsystem 1100 and may cause the VMCS 1000 to issue alerts and/or cause automatic braking events upon exceeding safe operating thresholds in the manners discussed above.

Aspects of the techniques described herein may be implemented in digital electronic circuitry, computer software, firmware, or hardware, including the structures disclosed herein and their structural equivalents, or in various combinations. Aspects of the techniques described herein may be implemented as one or more computer programs, for example, one or more sets of program instructions residing on or encoded in a computer-readable storage medium for execution by, or to control the operation of, one or more processors. Alternatively or in addition, the instructions may be encoded on an artificially-generated propagated signal, for example, a machine-generated electrical, optical, or electromagnetic signal that may be generated to encode information for transmission to a suitable receiver apparatus for execution by one or more processors. A computer-readable medium may be, or be included in, a computer-readable storage device, a computer-readable storage substrate, a random or serial access memory array or device, various combinations thereof. Moreover, while a computer-readable medium may or may not be a propagated signal, a computer-readable medium may be a source or destination of program instructions encoded in an artificially-generated propagated signal. The computer-readable medium may also be, or be included in, one or more separate physical components or media (for example, CDs, disks, or other storage devices).

Certain techniques described in this specification may be implemented as operations performed by one or more processors on data stored on one or more computer-readable mediums or received from other sources. The term "processor" may encompass various kinds of apparatuses, devices, or machines for processing data, including by way of example a central processing unit, a microprocessor, a microcontroller, a digital-signal processor, programmable processor, a computer, a system on a chip, or various combinations thereof. The processor may include special purpose logic circuitry, for example, a field programmable gate array or an application-specific integrated circuit.

Program instructions (for example, a program, software, software application, script, or code) may be written in various programming languages, including compiled or interpreted languages, declarative or procedural languages, and may be deployed in various forms, for example as a stand-alone program or as a module, component, subroutine, object, or other unit suitable for use in a computing environment. Program instructions may correspond to a file in a file system. Program instructions may be stored in a portion of a file that holds other programs or data (for example, one or more scripts stored in a markup language document), in a dedicated file or in multiple coordinated files (for example, files that store one or more modules, sub-programs, or portions of code). Program instructions may be deployed to be executed on one or more processors located at one site or distributed across multiple sites connected by a network.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Where the term "comprising" appears, it is contemplated that the terms "consisting essentially of" or "consisting of" could be used in its place to describe certain embodiments of the present technology. Further, all references cited herein are incorporated in their entireties.

What is claimed:

1. A system for evaluating vehicle operation compliance, wherein the system comprises:
    a control signal interface subsystem; and
    a vehicle-mounted subsystem configured to:
        communicate with the control signal interface subsystem to receive information corresponding to a status of a control signal;
        determine a rule for behavior of a vehicle according to the information corresponding to the status of the control signal; and
        observe operation of the vehicle to evaluate compliance with the rule;
    wherein:
        the control signal interface subsystem comprises an ultra-wideband (UWB) communications component;
        the vehicle-mounted subsystem comprises an ultra-wideband (UWB) communications component; and
        the vehicle-mounted subsystem and the control signal interface subsystem are further configured to communicate UWB signals carrying data pertinent to evaluating vehicle operation compliance, the data comprising at least one of: a unique ID associated with the vehicle-mounted subsystem, a signal indication, a track number, a track direction, speed, and direction of travel.

2. The system of claim 1, wherein the rule corresponds to the status of the control signal being at least one of red, double red, yellow, or double yellow.

3. The system of claim 1, wherein the rule specifies a stop-time duration for the vehicle.

4. The system of claim 3, wherein the rule specifies a speed for the vehicle.

5. The system of claim 4, wherein the rule specifies a maximum speed for the vehicle after an expiration of the stop-time.

6. The system of claim 1, wherein the vehicle-mounted subsystem is configured to:
    interface with a braking system of the vehicle;
    communicate with the UWB communications component of the control signal interface subsystem via the UWB communications component of the vehicle-mounted subsystem; and
    determine a distance between the vehicle-mounted subsystem and the control signal interface subsystem based on a time-of-flight of at least one communication between the UWB communications component of the control signal interface subsystem and the UWB communications component of the vehicle-mounted subsystem.

7. The system of claim 1, wherein the vehicle-mounted subsystem is further configured to generate an alert if a distance between the vehicle-mounted subsystem and the control signal interface subsystem is less than a threshold.

8. The system of claim 1, wherein the vehicle-mounted subsystem is further configured to cause a braking system of the vehicle to activate if a distance between the vehicle-mounted subsystem and the control signal interface subsystem is less than a threshold.

9. The system of claim 1, wherein the vehicle-mounted subsystem further comprises
    a radio-frequency identification (RFID) subsystem configured to scan at least one RFID tag external to the vehicle to retrieve information stored on the at least one RFID tag.

10. The system of claim 9, wherein:
    the vehicle-mounted subsystem is further configured to substantially continuously receive information relating to speed of the vehicle; and
    the vehicle-mounted subsystem determines a changing distance between the vehicle-mounted subsystem and the control signal interface subsystem based on the information stored on the at least one RFID tag and the information relating to speed of the vehicle.

11. The system of claim 9, wherein the vehicle-mounted subsystem is further configured to determine a distance between the vehicle-mounted subsystem and the control signal interface subsystem based on the information stored on the at least one RFID tag.

12. The system of claim 1, further comprising:
    an access point external to the vehicle; and
    wherein the vehicle-mounted subsystem is further configured to:
        store data relating to prior behavior of the vehicle; and
        communicate the data relating to prior behavior of the vehicle with the access point.

13. The system of claim 1, further comprising:
    a second vehicle-mounted subsystem including a UWB communications component, wherein the second vehicle-mounted subsystem is configured to be mounted on another vehicle; and
    wherein the vehicle-mounted subsystem is configured to:
        communicate with the UWB communications component of the control signal interface subsystem via the UWB communications component of the vehicle-mounted subsystem;
        communicate with the UWB communications component of the second vehicle-mounted subsystem via the UWB communications component of the vehicle-mounted subsystem;
        determine a distance between the vehicle-mounted subsystem and the control signal interface subsystem based on a time-of-flight of at least one communication between the UWB communications component of the control signal interface subsystem and the UWB communications component of the vehicle-mounted subsystem; and
        determine a distance between the vehicle-mounted subsystem and the second vehicle-mounted subsystem based on a time-of-flight of at least one communication between the UWB communications component of the second vehicle-mounted subsystem and the UWB communications component of the vehicle-mounted subsystem.

14. The system of claim 13, wherein the vehicle-mounted subsystem is further configured to:
    generate an alert if the distance between the vehicle-mounted subsystem and the control signal interface subsystem is less than a first threshold; and
    generate an alert if the distance between the vehicle-mounted subsystem and the second vehicle-mounted subsystem is less than a second threshold.

15. The system of claim 13, wherein the vehicle-mounted subsystem is further configured to:
cause a braking system of the vehicle to activate if the distance between the vehicle-mounted subsystem and the control signal interface subsystem is less than a first threshold; and
cause the braking system of the vehicle to activate if the distance between the vehicle-mounted subsystem and the second vehicle-mounted subsystem is less than a second threshold.

16. The system of claim 13, wherein the vehicle-mounted subsystem further comprises:
a radio-frequency identification (RFID) subsystem configured to scan at least one RFID tag external to the vehicle to retrieve information stored on the at least one RFID tag; and
wherein the vehicle-mounted subsystem is further configured to determine a distance between the vehicle-mounted subsystem and the control signal interface subsystem based on the information stored on the at least one RFID tag.

17. The system of claim 16, wherein:
the vehicle-mounted subsystem is further configured to substantially continuously receive information relating to speed of the vehicle; and
the vehicle-mounted subsystem determines a changing distance between the vehicle-mounted subsystem and the control signal interface subsystem based on the information stored on the at least one RFID tag and the information relating to speed of the vehicle.

18. The system of claim 13, further comprising:
an access point external to the vehicle; and
wherein the vehicle-mounted subsystem is further configured to:
store data relating to prior behavior of the vehicle; and
communicate the data relating to prior behavior of the vehicle with the access point.

* * * * *